(12) United States Patent
Chen et al.

(10) Patent No.: US 11,121,996 B2
(45) Date of Patent: Sep. 14, 2021

(54) METHOD AND APPARATUS FOR DISPLAYING EVENTS RELATED TO PEER COMMUNICATION PARTY TO LOCAL COMMUNICATION PARTY

(71) Applicant: Alibaba Group Holding Limited, Grand Cayman (KY)

(72) Inventors: Hang Chen, Zhejiang (CN); Zhenhao Wu, Zhejiang (CN); Lili Zhang, Zhejiang (CN); Daping Zhang, Zhejiang (CN); Di Zhang, Zhejiang (CN); Lidong Cao, Zhejiang (CN); Di Su, Zhejiang (CN); Yixin Huang, Zhejiang (CN); Jianjun Zhao, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/295,891

(22) Filed: Mar. 7, 2019

(65) Prior Publication Data
US 2019/0207893 A1 Jul. 4, 2019

Related U.S. Application Data

(63) Continuation of application No. PCT/CN2017/100025, filed on Aug. 31, 2017.

(30) Foreign Application Priority Data

Sep. 8, 2016 (CN) .......................... 201610811745.5

(51) Int. Cl.
*G06F 15/16* (2006.01)
*H04L 12/58* (2006.01)
(Continued)

(52) U.S. Cl.
CPC ............ *H04L 51/16* (2013.01); *H04L 51/046* (2013.01); *H04L 51/12* (2013.01); *H04L 51/22* (2013.01);
(Continued)

(58) Field of Classification Search
CPC ....... H04L 51/16; H04L 51/046; H04L 51/12; H04L 51/22; H04L 51/36; H04L 51/04;
(Continued)

(56) References Cited

U.S. PATENT DOCUMENTS 5,848,271 A * 12/1998 Caruso ................... G06Q 10/10
712/220
5,862,322 A * 1/1999 Anglin ................... G06Q 10/10
714/57
(Continued)

FOREIGN PATENT DOCUMENTS

CN 103139761 A 6/2013
CN 104065614 A 9/2014
(Continued)

OTHER PUBLICATIONS

Translation of Chinese Office Action dated Sep. 9, 2019, from corresponding CN Patent Application No. 201610811745.5, 17 pages.
(Continued)

*Primary Examiner* — Phuoc H Nguyen
(74) *Attorney, Agent, or Firm* — Lee & Hayes, P.C.

(57) ABSTRACT

A method may include the following. Preset events related to a peer communication party are determined. The preset events are generated by operations performed by the peer communication party based on a communication application. Whether a communication page of a local communication party with the peer communication party is in an open state is detected. Description information of the preset
(Continued)

events is displayed in an expedited processing page associated with the communication page in a centralized manner when the communication page is detected to be in an open state. Using the technical solutions of the present application, the local communication party can open and view the expedited processing page conveniently and quickly when communicating with the peer communication party, and view and process corresponding preset events, thereby further simplifying the user operations and improving processing efficiency.

20 Claims, 26 Drawing Sheets

(51) Int. Cl.
  *H04M 19/04* (2006.01)
  *H04M 1/725* (2021.01)
(52) U.S. Cl.
  CPC ............ *H04L 51/36* (2013.01); *H04M 1/725* (2013.01); *H04M 19/04* (2013.01)
(58) Field of Classification Search
  CPC .. H04M 19/04; H04M 1/725; H04M 1/72522; H04M 1/72552; H04M 2250/60; H04M 1/72586; H04M 1/575; H04M 1/72583; G06F 16/9574
  See application file for complete search history.

(56) References Cited

U.S. PATENT DOCUMENTS

| | | | | |
|---|---|---|---|---|
| 6,640,249 | B1* | 10/2003 | Bowman-Amuah | G06F 8/36 709/228 |
| 7,139,999 | B2* | 11/2006 | Bowman-Amuah | G06Q 10/06 717/101 |
| 7,289,964 | B1* | 10/2007 | Bowman-Amuah | G06F 9/5038 705/1.1 |
| 7,509,388 | B2* | 3/2009 | Allen | G06Q 10/109 709/207 |
| 7,603,412 | B2* | 10/2009 | Beyda | G06Q 10/107 709/204 |
| 7,707,249 | B2* | 4/2010 | Spataro | H04L 65/403 709/205 |
| 7,953,806 | B2* | 5/2011 | Lyle | H04L 51/04 709/206 |
| 8,341,532 | B2* | 12/2012 | Ryan | G06Q 10/10 715/751 |
| 8,370,767 | B2* | 2/2013 | Kotler | G06Q 10/109 715/810 |
| 8,682,973 | B2* | 3/2014 | Kikin-Gil | H04L 65/4015 709/204 |
| 8,688,854 | B2 | 4/2014 | Choi et al. | |
| 8,781,998 | B2* | 7/2014 | Jafri | G06Q 10/0633 707/608 |
| 8,788,590 | B2* | 7/2014 | Culver | G06Q 10/067 709/205 |
| 8,789,014 | B2* | 7/2014 | Robison | G06F 8/30 717/120 |
| 8,868,657 | B2* | 10/2014 | Yoakum | G06Q 10/101 709/205 |
| 8,938,677 | B2* | 1/2015 | Geppert | H04M 3/563 715/734 |
| 8,972,495 | B1* | 3/2015 | Borna | H04L 67/42 709/204 |
| 9,240,970 | B2* | 1/2016 | Holzman | H04L 12/1822 |
| 9,275,161 | B2* | 3/2016 | Kass | H04L 65/403 |
| 9,305,272 | B2* | 4/2016 | Abrams | G06Q 10/06 |
| 9,369,413 | B2* | 6/2016 | Borna | H04L 51/12 |
| 9,411,844 | B2* | 8/2016 | Leckband | G06F 16/2336 |
| 9,466,049 | B2* | 10/2016 | DeHaan | G06F 3/0484 |
| 9,514,424 | B2* | 12/2016 | Kleinbart | G06Q 10/06 |
| 9,544,158 | B2* | 1/2017 | Kotler | H04L 12/1813 |
| 9,560,091 | B2* | 1/2017 | Kass | G06Q 50/01 |
| 9,660,993 | B2* | 5/2017 | Brill | H04L 63/10 |
| 9,661,142 | B2* | 5/2017 | Gunasekar | H04M 3/567 |
| 9,786,164 | B2 | 10/2017 | Leblond | |
| 9,813,538 | B2 | 11/2017 | Cai et al. | |
| 9,892,105 | B2* | 2/2018 | Umapathy | G06F 3/0482 |
| 9,998,555 | B2* | 6/2018 | Larabie-Belanger | G06F 9/52 |
| 10,033,850 | B2* | 7/2018 | Li | H04M 1/57 |
| 10,075,489 | B2* | 9/2018 | Abrams | G06Q 10/06316 |
| 10,078,817 | B2* | 9/2018 | Vinnakota | G06Q 10/101 |
| 10,091,287 | B2* | 10/2018 | Larabie-Belanger | G06F 16/176 |
| 10,097,557 | B2* | 10/2018 | Armer | H04L 63/105 |
| 10,108,613 | B2* | 10/2018 | Spataro | G06Q 10/10 |
| 10,127,524 | B2* | 11/2018 | Burtner | G06Q 10/101 |
| 10,171,579 | B2* | 1/2019 | Larabie-Belanger | H04L 67/24 |
| 10,193,834 | B2 | 1/2019 | Zhang et al. | |
| 10,210,467 | B2* | 2/2019 | Bastide | H04L 51/34 |
| 10,225,352 | B2* | 3/2019 | Hitomi | H04L 67/306 |
| 10,248,387 | B2* | 4/2019 | Bharthulwar | G06F 8/77 |
| 10,270,871 | B2* | 4/2019 | Larabie-Belanger | G06F 16/972 |
| 10,326,724 | B2* | 6/2019 | Bastide | H04L 51/18 |
| 10,331,437 | B2* | 6/2019 | Boss | G06N 99/005 |
| 10,412,434 | B1 | 9/2019 | Matthews | |
| 10,469,646 | B2* | 11/2019 | Kim | H04M 1/27453 |
| 10,540,620 | B2* | 1/2020 | Torres | G06Q 10/06313 |
| 10,652,188 | B2* | 5/2020 | Selekman | H04L 67/306 |
| 10,725,626 | B2* | 7/2020 | Meixner | H04L 51/046 |
| 10,728,352 | B2* | 7/2020 | Song | H04L 51/32 |
| 10,757,043 | B2* | 8/2020 | Gershony | H04L 51/18 |
| 10,810,322 | B2* | 10/2020 | Dotan-Cohen | H04L 63/105 |
| 10,834,218 | B2* | 11/2020 | Lu | G06Q 50/01 |
| 10,841,264 | B2* | 11/2020 | Jayaram | H04L 51/22 |
| 10,860,587 | B2* | 12/2020 | Koukoumidis | G06F 16/3329 |
| 2002/0071540 | A1* | 6/2002 | Dworkin | H04L 12/1818 379/202.01 |
| 2002/0130904 | A1* | 9/2002 | Becker | H04L 51/04 715/753 |
| 2002/0184535 | A1* | 12/2002 | Moaven | G06F 21/6218 726/17 |
| 2003/0208545 | A1* | 11/2003 | Eaton | H04L 29/06 709/206 |
| 2003/0233416 | A1* | 12/2003 | Beyda | G06Q 10/107 709/206 |
| 2003/0233417 | A1* | 12/2003 | Beyda | H04L 29/06 709/206 |
| 2004/0044736 | A1* | 3/2004 | Austin-Lane | H04L 51/00 709/206 |
| 2005/0071426 | A1* | 3/2005 | Shah | H04L 51/04 709/204 |
| 2005/0071433 | A1* | 3/2005 | Shah | H04L 51/04 709/207 |
| 2005/0138631 | A1* | 6/2005 | Bellotti | G06Q 10/06 719/310 |
| 2006/0053194 | A1* | 3/2006 | Schneider | H04L 67/36 709/204 |
| 2006/0053195 | A1* | 3/2006 | Schneider | H04L 67/26 709/204 |
| 2006/0080432 | A1* | 4/2006 | Spataro | H04L 67/38 709/224 |
| 2006/0080468 | A1* | 4/2006 | Vadlamani | G06F 9/548 709/250 |
| 2007/0005413 | A1* | 1/2007 | Hennings | G06Q 10/06311 705/7.13 |
| 2007/0198648 | A1* | 8/2007 | Allen | G06Q 10/109 709/207 |
| 2007/0198677 | A1* | 8/2007 | Ozhan | G06Q 10/107 709/223 |
| 2008/0005235 | A1* | 1/2008 | Hegde | G06Q 10/10 709/204 |
| 2008/0091782 | A1* | 4/2008 | Jakobson | G06Q 10/10 709/206 |

(56) References Cited

U.S. PATENT DOCUMENTS

| | | | |
|---|---|---|---|
| 2008/0147774 A1* | 6/2008 | Tummalapenta | H04L 51/34 709/202 |
| 2008/0229214 A1* | 9/2008 | Hamilton | H04L 67/22 715/751 |
| 2008/0244418 A1* | 10/2008 | Manolescu | G06Q 10/00 715/753 |
| 2010/0180212 A1* | 7/2010 | Gingras | G06Q 10/109 715/751 |
| 2010/0262665 A1 | 10/2010 | Ouyang et al. | |
| 2012/0134480 A1* | 5/2012 | Leeds | H04M 1/57 379/88.12 |
| 2012/0179502 A1* | 7/2012 | Farooq | H04L 12/1818 705/7.13 |
| 2012/0269185 A1* | 10/2012 | Castleman | H04L 65/4007 370/352 |
| 2012/0278388 A1* | 11/2012 | Kleinbart | G06Q 10/10 709/204 |
| 2013/0159883 A1* | 6/2013 | Yerli | G06Q 30/02 715/753 |
| 2013/0179515 A1* | 7/2013 | Chi | H04L 12/1818 709/206 |
| 2013/0212197 A1* | 8/2013 | Karlson | G06Q 10/06314 709/206 |
| 2013/0322608 A1* | 12/2013 | Jesse | H04M 3/493 379/88.01 |
| 2014/0026062 A1 | 1/2014 | Proudfoot et al. | |
| 2014/0032684 A1* | 1/2014 | Chung | H04L 51/04 709/206 |
| 2014/0164945 A1 | 6/2014 | Junqua et al. | |
| 2014/0278639 A1* | 9/2014 | MacGillivray | G06Q 10/06311 705/7.15 |
| 2014/0342670 A1 | 11/2014 | Kang et al. | |
| 2015/0040033 A1* | 2/2015 | Kurtz | G06Q 10/107 715/752 |
| 2015/0081486 A1* | 3/2015 | Niazi | G06Q 10/1091 705/32 |
| 2015/0256664 A1 | 9/2015 | Guo | |
| 2015/0304432 A1* | 10/2015 | Mallet | H04L 43/045 709/228 |
| 2015/0310507 A1 | 10/2015 | Woodward et al. | |
| 2015/0365514 A1* | 12/2015 | Li | H04M 1/57 455/414.1 |
| 2016/0014231 A1* | 1/2016 | Le Huerou | H04L 12/1813 715/758 |
| 2016/0062968 A1* | 3/2016 | Umapathy | G06F 40/169 715/752 |
| 2016/0065897 A1* | 3/2016 | Gottlieb | H04N 7/155 348/14.08 |
| 2016/0099984 A1* | 4/2016 | Karagiannis | H04L 65/1083 709/206 |
| 2016/0149974 A1* | 5/2016 | Abrams | G06Q 10/06 715/752 |
| 2016/0180259 A1 | 6/2016 | Marianko et al. | |
| 2016/0191694 A1* | 6/2016 | Kim | H04M 1/56 455/418 |
| 2016/0261655 A1* | 9/2016 | Aggarwal | H04L 12/18 |
| 2017/0005977 A1* | 1/2017 | Snabl | H04L 51/046 |
| 2017/0026318 A1* | 1/2017 | Daniel | H04L 51/046 |
| 2017/0099297 A1* | 4/2017 | Armer | H04L 67/02 |
| 2017/0109013 A1* | 4/2017 | Hong | G06F 3/04817 |
| 2017/0149701 A1* | 5/2017 | Mancine | H04L 51/04 |
| 2017/0171121 A1* | 6/2017 | Zhang | H04L 51/32 |
| 2017/0286913 A1 | 10/2017 | Liu et al. | |
| 2017/0323267 A1* | 11/2017 | Baek | G06Q 10/063114 |
| 2017/0331779 A1 | 11/2017 | Chen et al. | |
| 2018/0069906 A1* | 3/2018 | Yang | H04L 65/1069 |
| 2018/0152407 A1* | 5/2018 | Soni | H04L 51/34 |
| 2018/0189894 A1* | 7/2018 | Hong | G06Q 50/01 |
| 2018/0341928 A1* | 11/2018 | Khan | H04L 51/02 |
| 2018/0351901 A1* | 12/2018 | Snider | G06N 20/00 |
| 2018/0365296 A1* | 12/2018 | Koukoumidis | G06F 16/3329 |
| 2018/0367483 A1* | 12/2018 | Rodriguez | H04L 51/046 |
| 2018/0367484 A1* | 12/2018 | Rodriguez | H04L 65/403 |
| 2018/0375804 A1* | 12/2018 | Stillwell, Jr. | H04L 67/20 |
| 2018/0375806 A1* | 12/2018 | Manning | G06F 16/9566 |
| 2019/0052701 A1* | 2/2019 | Rathod | H04L 67/22 |
| 2019/0196693 A1* | 6/2019 | Yang | H04L 51/26 |
| 2019/0207897 A1* | 7/2019 | Arastafar | H04L 51/00 |
| 2019/0212829 A1* | 7/2019 | Yang | G06Q 10/109 |
| 2020/0111060 A1* | 4/2020 | Yang | G06Q 10/10 |
| 2020/0167699 A1* | 5/2020 | Cohen | H04L 51/32 |
| 2020/0311680 A1* | 10/2020 | Wahl | G06F 16/93 |

FOREIGN PATENT DOCUMENTS

| | | |
|---|---|---|
| CN | WO2015158129 A1 | 10/2015 |
| CN | 105162982 A | 12/2015 |
| CN | WO2016048034 A1 | 3/2016 |
| CN | WO2016179809 A1 | 11/2016 |

OTHER PUBLICATIONS

Translation of International Search Report from PCT application No. PCT/CN2017/100025 dated Mar. 15, 2018, 2 pages.

Non Final Office Action dated Mar. 12, 2020 for U.S. Appl. No. 16/295,891 "Event Display Method and Apparatus" Chen, 22 pages.

Translation of Written Opinion from PCT application No. PCT/CN2017/100025 dated Mar. 15, 2018, 4 pages.

Translation of Supplemental Search Report dated Mar. 27, 2020, from corresponding CN Patent Application No. 2016108117455, 1 page.

Translation of Supplemental Search Report dated Mar. 4, 2020, from corresponding CN Patent Application No. 2016108117455, 1 page.

* cited by examiner

METHOD AND APPARATUS FOR
DISPLAYING EVENTS RELATED TO PEER
COMMUNICATION PARTY TO LOCAL
COMMUNICATION PARTY

CROSS REFERENCE TO RELATED PATENT APPLICATIONS

This application claims priority to and is a continuation of PCT Patent Application No. PCT/CN2017/100025 filed on 31 Aug. 2017, and is related to and claims priority to Chinese Patent Application No. 201610811745.5, filed on 8 Sep. 2016, entitled "Event Display Method and Apparatus," which are hereby incorporated by reference in their entirety.

TECHNICAL FIELD

The present disclosure relates to the field of communication technologies, and particularly to event displays methods and apparatuses.

BACKGROUND

In a process of communicating with a peer communication party, a local communication party may wish to view preset events related to the peer communication party, to understand a situation of the peer communication party, or a relationship with the peer communication party.

As functions of communication applications become more and more abundant, not only communication functions are supported, but also group processing functions such as mail, approval, attendance, etc., are supported. As such, preset events as mentioned above also have various types, which can help a local communication party to better understand relevant information.

However, each function in a communication application is relatively independent to each other. A local communication party needs to find corresponding function entries, manually triggers the function entries to start corresponding function pages, and searches and views related preset events in these function pages, thus resulting in a problem of low inefficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, the present application provides a method and an apparatus for displaying events, which can simplify user operations of a local communication party and improve the processing efficiency when the local communication party wants to view or process preset events related to a peer communication party.

To achieve the above objectives, the present application provides the following technical solutions.

In implementations, an event display method is provided, which includes determining preset events related to a peer communication party; and displaying description information of the preset events in an expedited processing page associated with a communication page of the peer communication party in a centralized manner when the communication page is in an open state.

In implementations, an event display method is provided, which includes determining a type of relationship with a peer communication party; obtaining preset events related to the peer communication party according to the type of relationship; and displaying description information of the preset events in an expedited processing page associated with a communication page of the peer communication party in a centralized manner when the communication page is in an open state.

In implementations, an event display method is provided, which includes showing a chat page with a peer communication party, a blank area of the chat page including a page callout identifier; displaying a historical chat record with the peer communication party in a message display area of the chat page when a first downward sliding operation is detected on the chat page and the first downward sliding operation is not related to the page callout identifier; calling an expedited processing page associated with the chat page when a second downward sliding operation is detected on the chat page and the second downward sliding operation is related to the page callout identifier, and displaying a historical event set of a preset type in the historical chat record in the expedited processing page.

In implementations, an event display apparatus is provided, which includes a determination unit to determine preset events related to a peer communication party; and a display unit to display description information of the preset events in an expedited processing page associated with a communication page of the peer communication party in a centralized manner when the communication page is in an open state.

In implementations, an event display apparatus is provided, which includes a type determination unit to determine a type of relationship with a peer communication party; an event acquisition unit to obtain preset events related to the peer communication party according to the type of relationship; and an information display unit to display description information of the preset events in an expedited processing page associated with a communication page of the peer communication party in a centralized manner when the communication page is in an open state.

In implementations, an event display apparatus is provided, which includes a page display unit to show a chat page with a peer communication party, a blank area of the chat page including a page callout identifier; a record display unit to display a historical chat record with the peer communication party in a message display area of the chat page when a first downward sliding operation is detected on the chat page and the first downward sliding operation is not related to the page callout identifier; and an event display unit to call an expedited processing page associated with the chat page when a second downward sliding operation is detected on the chat page and the second downward sliding operation is related to the page callout identifier, and to display a historical event set of a preset type in the historical chat record in the expedited processing page.

As can be seen from the above technical solutions, the present application collects preset events related to a peer communication party and collectively displays the preset events in an expedited processing page, so that a local communication party does not need to specifically find and trigger a function entry of each function, thus helping to simplify user operations and increase processing efficiency. At the same time, since the expedited processing page is associated with a communication page of the local communication party with the peer communication party, the local communication party can open and view the expedited processing page conveniently and quickly when communicating with the peer communication party, and view and process corresponding preset events, thereby further simplifying the user operations and improving the processing efficiency.

DETAILED DESCRIPTION

In order to describe the present application in further detail, the following embodiments are provided.

Figure 1:
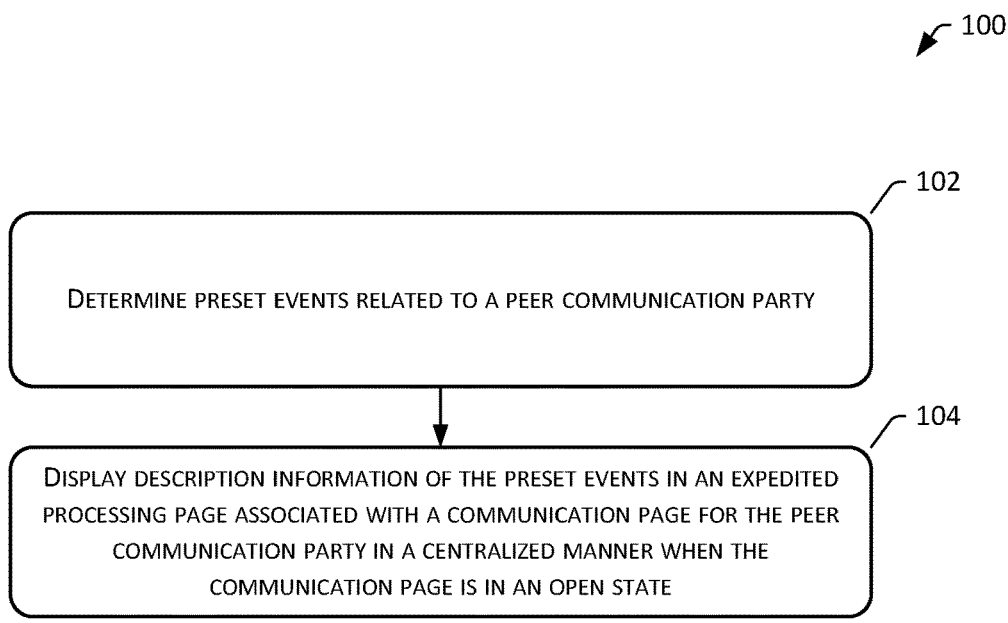
FIG. 1 is a flowchart of an event display method provided by an exemplary embodiment of the present application.

FIG. 1 is a flowchart of an event display method 100 provided by an exemplary embodiment of the present application. As shown in FIG. 1, the method 100 is applied in an electronic device, and may include the following operations.

Operation 102: Determine preset events related to a peer communication party.

In implementations, the peer communication party performs operations based on a communication application to generate corresponding preset event(s). The communication application can support communication functions, and can also support group processing functions such as approval and attendance, or other functions. Correspondingly, the preset event(s) related to the peer communication party can include at least one of the following: communication events related to communication activities, for example, a call event, an instant messaging event, etc., and group processing events related to the group processing functions, such as an approval event, a project information reporting event, etc., when group processing functions are included in the communication application corresponding to a communication page. Groups in the present application may include various types such as an enterprise, a school, a government agency, and a troop, which are not limited by the present application.

The communication application may only support communication functions. Alternatively, the communication application may support communication functions and group processing functions at the same time. For example, the communication application may be a group communication application, such as an enterprise instant messaging (EIM) application, "DING Talk", etc. Apparently, the present application does not impose any limitations thereon.

In implementations, the preset events related to the peer communication party may be determined by using at least one of the following methods: automatically extracting preset events that are of a preset type and are related to the peer communication party from recorded historical events; and determining preset events that are of a preset type and are related to the peer communication party from detected real-time events; creating preset events related to the peer communication party according to a customizing operation of the local communication party in an expedited processing page. For example, a corresponding customizing function button may be added to an expedited processing page, so that the local communication party can customize corresponding preset events by triggering the customizing function button, thereby recording events that cannot be generated or selected automatically.

In implementations, a client of a communication application is installed on an electronic device, and the communication page, the expedited processing page, etc., can be presented through the client. The preset events related to the peer communication party may be proactively obtained by the client. Alternatively, a server corresponding to the client may notify the client after the preset events related to the peer communication party are obtained thereby. Alternatively, the preset events may also be determined by other means, and the present application does not impose any limitations thereon.

In implementations, the preset events related to the peer communication party may be related to the peer communication party itself only, such as an activation date of an account the peer communication party, a change of group attribution information, and the like.

In another embodiment, the preset events associated with the peer communication party may be related to the peer communication party and other users. For example, when the local communication party views the expedited processing page, the preset events may include: a first type of event between the local communication party and the peer communication party, for example, a management event of the peer communication party by the local communication party, etc., and a second type of event between another communication party (which is different from the local communication party) and the peer communication party, such as management events of the peer communication party by other communication party, etc., where the local communication party has a browsing permission for the second type of event.

The local communication party can obtain a browsing permission for the second type of event in multiple ways. For example, when the local communication party belongs to a same group of the other communication party, and has group ownership information that is inconsistent with that of the peer communication party, the local communication party can obtain the above browsing permissions by using at least one of the following methods:

The local communication party obtains the browsing permission for the second type of event when configured to communicate with the peer communication party on behalf of the other communication party. For example, the local communication party and the other communication party are both assumed to be procurement personnel of an enterprise AA, and the peer communication party is sales personnel of a supplier enterprise BB. Originally, the other communication party makes purchases and connections with the peer communication party, and generates a corresponding second type of event. In this case, the other communicating party necessarily has the permission to browse the second type of event. After the other communicating party resigns from the enterprise, the local communicating party is assigned to replace the other communicating party to make purchases and connections with the peer communication party. As such, the local communication party can obtain the original browsing permission of the other communication party to realize presenting and viewing the second type of event.

A management level of the local communication party is higher than that of the other communication party. For example, when the local communication party is a leader of a department of the other communication party, the local communication party can browse the second type of event between the other communication party and the peer communication party, to facilitate realizing management within a group.

The local communication party is given the permission to browse the second type of event by the other communication party. For example, the communication application can provide configuration options to the other communication party, so that the other communication party can assign the browsing permission to the local communication party. For example, when the other communication party and the local communication party are colleagues in a same department, this helps mutual assistance of the two parties in a work process and helps to improve work efficiency.

In implementations, when respective group ownership information of the local communication party and the peer communication party is inconsistent, for example, the local communication party and the peer communication party belong to different groups, the preset events may include all preset events of the preset type that are related to the peer communication party, so that the local communication party can fully understand conditions of the peer communication party. When respective group ownership information of the local communication party and the peer communication party is consistent, the preset events include preset events to be processed that are of the preset type and are related to the peer communication party. For example, when the local communication party is a department leader of the peer communication party, the preset events to be processed may be an approval request sent to the local communication party by the peer communication party, so that the local communication party can process the approval request in a timely and convenient manner.

Operation 104: Display description information of the preset events in an expedited processing page associated with a communication page for the peer communication party in a centralized manner when the communication Page is in an open state.

In implementations, in response to detecting that the communication page is in the open state, the expedited processing page may be synchronously displayed to collectively display the description information of the preset events. For example, in response to detecting that the local communication party starts the communication page, the expedited processing page can be started synchronously. Alternatively, in response to detecting that the local communication party starts the communication page, corresponding preset events can be further examined, and when preset event(s) to be processed is/are included, the expedited processing page is synchronized and displays the corresponding pending event(s) to be processed. Otherwise, the expedited processing page may not be started synchronously.

Apparently, when the communication page is in the open state, the local communication party can also actively trigger a display of the expedited processing page. For example, the expedited processing page can be switched from a hidden state to a displayed state when a preset triggering operation for the communication page is detected, to display the description information of the preset events in a centralized manner.

In implementations, the expedited processing page may include multiple modes to facilitate different display purposes. For example, when the expedited processing page is displayed in a detail mode, all preset events can be displayed collectively on the expedited processing page in order to facilitate a full browsing of the local communication party. When an abbreviated mode is used to display the expedited processing page, preset events that are to be processed in the preset events are displayed on the expedited processing page, so that the local communication party can quickly view and process the preset events to be processed without performing a search from among a plurality of preset events, thereby improving processing efficiency.

Furthermore, when the communication page is in the open state, if an occurrence of any preset event is detected, description information of the any preset event may then be displayed on the expedited processing page when the expedited processing page is in the detail mode. When the expedited processing page is in the hidden state (the local communication party can perform a triggering operation on the communication page to invoke the expedited processing page in the detail mode), the expedited processing page can be displayed in the abbreviated mode, and of the description information of the any preset event is displayed on the expedited processing page, so that the local communication party can conveniently view and process the any preset event in time while occlusion and influence of the communication page are minimized.

In implementations, when the triggering operation of the local communication party for the any preset event in the expedited processing page is detected, a preset operation for the any preset event may be performed. For example:

In one case, a detail page of the any preset event can be called up, and details of the any preset event are shown in the detail page.

In another case, when the any preset event is a preset event to be processed, the local communication party is an initiating party of the preset event, and the peer communication party is a processing party, a reminder message for the any preset event can be sent to the peer communication party. When the preset event is a preset event to be processed, and the local communication party is a processing party of the preset event, and the peer communication party is an initiating party, preset processing can be performed on the any preset event. For example, when the any preset event is an approval event, the local communication party acting as an initiating party may initiate a reminder message to the peer communication party by triggering the approval event. The reminder message may be a DING message supported by the DING Talk, for example. Alternatively, the local communication party acting as a processing party can directly complete processing of the approval event by triggering the approval event, such as approval passed or failed, without switching to a corresponding approval page, which helps to simplify user operations and improve processing efficiency.

In implementations, a description label for the peer communication party may be displayed in the expedited processing page to mark the peer communication party. Content of the description label may be related to at least one of the following factors: user information of the peer communication party, such as group ownership information of the peer communication party, the preset events related to the peer communication party, such as a number of orders sent by the peer communication party in the past, and a label configuration command of the local communication party for the peer communication party. In other words, the local communication party can implement a label customization of the peer communication party through the label configuration command, so that the local communication party can implement a corresponding management control.

As can be seen from the above technical solutions, the present application collects preset events related to a peer communication party and collectively displays the preset events in an expedited processing page, so that a local communication party does not need to specifically find and trigger a function entry of each function, thus helping to simplify user operations and increase processing efficiency. At the same time, since the expedited processing page is associated with a communication page of the local communication party with the peer communication party, the local communication party can open and view the expedited processing page conveniently and quickly when communicating with the peer communication party, and view and process corresponding preset events, thereby further simplifying the user operations and improving the processing efficiency.

Figure 2:
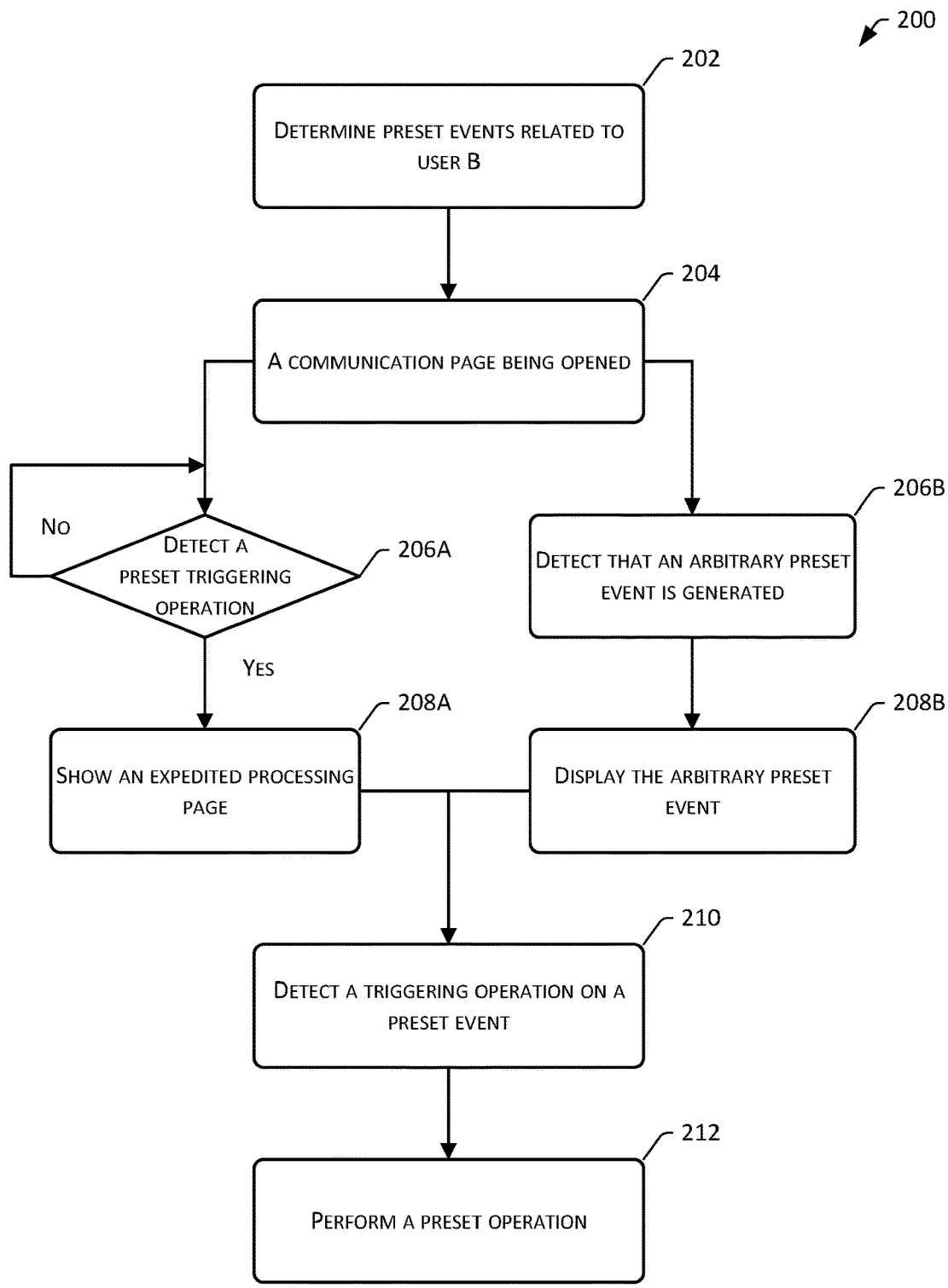
FIG. 2 is a flowchart of another event display method provided by an exemplary embodiment of the present application.

For the sake of understanding, a handling process in an enterprise scenario is used as an example hereinafter to describe the technical solutions of the present application in detail with reference to FIG. 2. FIG. 2 is a flowchart of another event display method 200 provided by an exemplary embodiment of the present application. As shown in FIG. 2, the local communication party and the peer communication party are assumed to be user A and user B respectively. The method is applied in an electronic device used by the user A. The electronic device is equipped with a DING Talk client. The DING Talk client specifically implements an event display function of the present application during a running process. The method 200 may include the following operations.

Operation 202: Determine preset events related to the user B.

In implementations, the user A and the user B are assumed to use device 1 and device 2 respectively. The device 1 and the device 2 are installed with DING Talk clients respectively. By running the DING Talk clients, the user A and the user B can realize communications through the device 1 and the device 2, and complete the event display function of the present application.

In implementations, the device 1 can actively determine preset event(s) related to the user B. Alternatively, the device 1 can initiate a request to a DING Talk server, so that the DING Talk server can push preset event(s) related to the user B to the device 1, to allow the device 1 to display the preset event(s). Apparently, the device 1 can also determine preset event(s) related to the user B by other means, which are not limited in the present application.

Operation 204: Detect whether a communication page with the user B is opened.

In implementations, the user A and the user B can conduct communications via any communication type. For example, when the user A and the user B conduct communications by means of instant messaging, the above communication page may be an instant messaging session page for the user A and the user B, and the instant messaging session page may be the one shown in FIG. 3.

Operation 206A: When a preset triggering operation on the communication page is detected, the process proceeds to operation 208A. Otherwise the process continues to perform detection.

Figure 3:
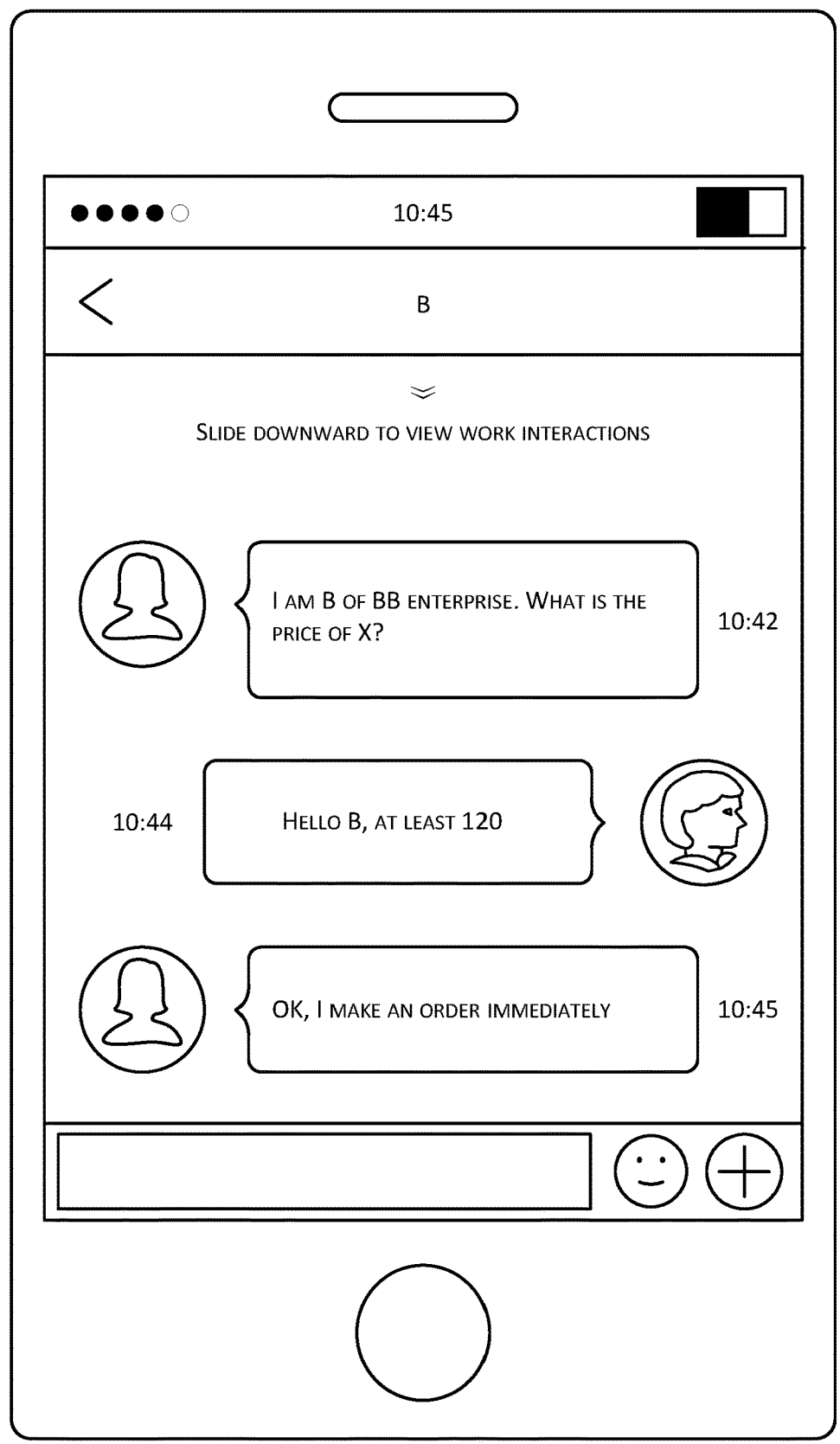
FIGS. 3-16 are schematic diagrams of interfaces for displaying a preset event according to an exemplary embodiment of the present application.

In implementations, a text of "slide down to view work contacts" and an icon of "", for example, can be displayed at the top of a message display area of the communication page as shown in FIG. 3, to provide guidance for a triggering operation of the user A. Therefore, the user A can complete such preset triggering operation as mentioned above by making a downward sliding touch gesture at the top of the message display area. Apparently, the preset triggering operation may also take other forms, which are not limited by the present application.

In practice, the sliding (i.e., downward sliding) operation as described above is also applied to other functions in related technologies. For example, a chat page as shown in FIG. 3 is taken as an example. The top of the chat page includes a page callout identifier such as a text of "slide down to view work contacts" and an icon of "". As such, when a sliding operation performed by a user is related to the page callout identifier, for example, when a starting point of the sliding operation is located at the page callout identifier, an expedited processing page of the present application may be called. When the sliding operation is not related to the page callout identifier, for example, the page callout identifier is located in a blank area of the chat page, a historical chat record between the user A and the user B may be displayed in the message display area of the chat page. Therefore, the user can realize various message display purposes through the chat page by simply distinguishing between ways of execution when a sliding operation is performed.

Operation 208A: Show an expedited processing page associated with the communication page.

Figure 4:
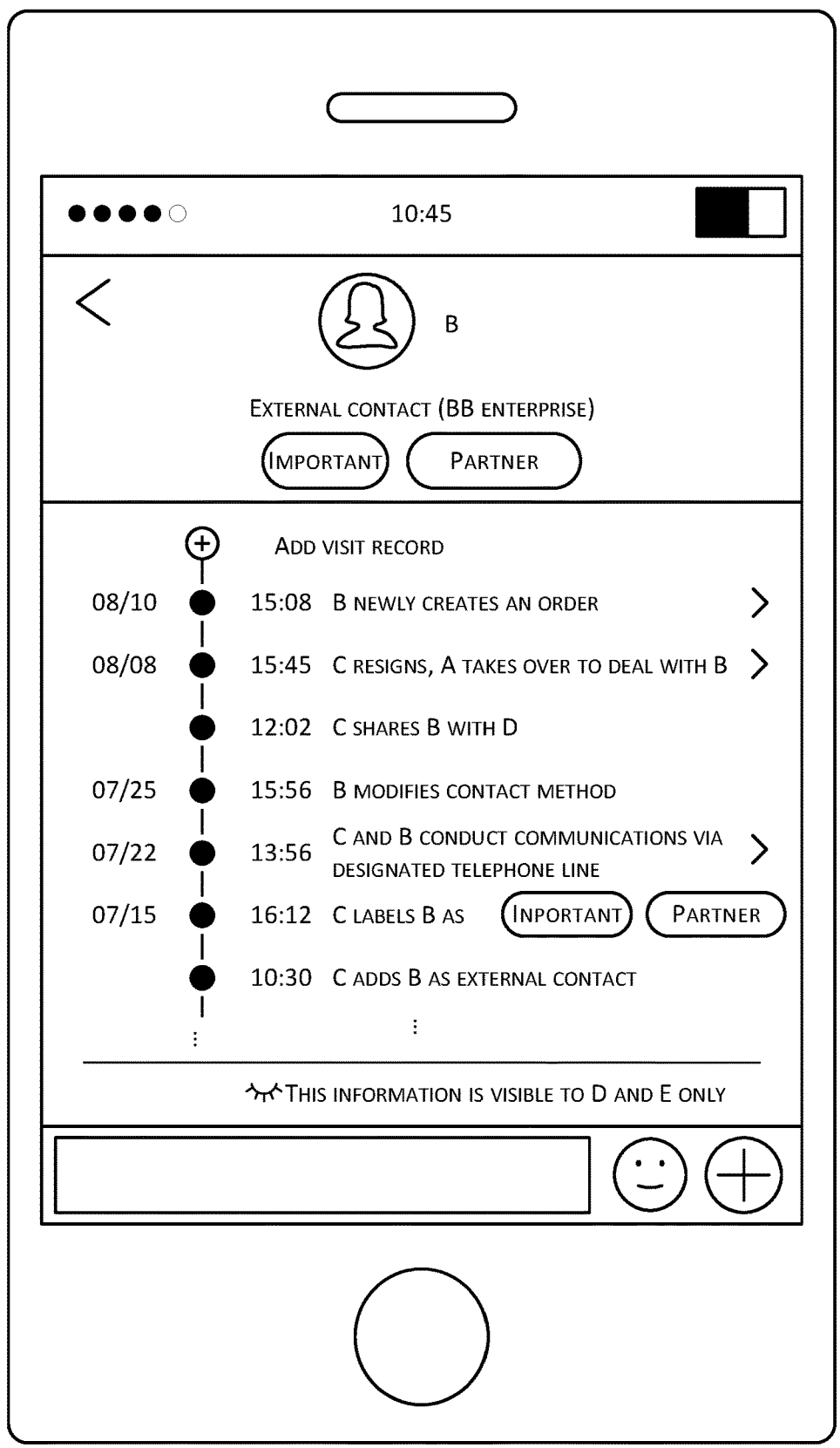

In implementations, after the user A performs the preset triggering operation on the communication page shown in FIG. 3, a transfer to an expedited processing page as shown in FIG. 4 is made. The expedited processing page shows descriptive information of preset events related to the user B. In other words, when the communication page as shown in FIG. 3 is in an open state, the expedited processing page is in a hidden state. When the preset triggering operation is detected, the expedited processing page can be considered to be switched from the hidden state to a display status as shown in FIG. 4, to collectively display the description information of the preset events related to the user B.

When the user A completes the downward sliding touch gesture, the expedited processing page may pause with a degree of completion of the touch gesture, so that the user A may generate a feeling of operation that "the expedited processing page is dragged by the finger", thus helping to enhance the experience thereof. When a distance that the user A slides down is less than a preset distance, the expedited processing page automatically retracts and returns to the hidden state. When the distance of downward sliding exceeds the preset distance, the expedited processing page may automatically be opened to a full extent to maintain the display status even if the finger of the user A is removed. When the user A wants to return to the communication page, a "⌢" icon is displayed at the bottom of the expedited processing page as shown in FIG. 4, indicating that the user A can retract the expedited processing page by performing a touch gesture of sliding upward on the expedited processing page, to return to the communication page as shown in FIG. 3. Apparently, the present application does not limit ways of how the page is returned.

In implementations, as shown in FIG. 4, when description information of a plurality of preset events is displayed in the expedited processing page, these pieces of description information may be arranged according to a corresponding time sequence of occurrences. For example, a reverse order is arranged according to a time sequence in FIG. 4, so that the user A can view the most recent preset events more conveniently. Apparently, the description information of the preset events may be arranged in other orders. For example, preset events of a type of interest that is configured by the user A may be arranged first, and preset events of other types are arranged thereafter, so that the user A can view the preset events of interest more conveniently.

Through the above embodiments, when the user A wants to complete any operation related to the user B, a communication function with the user B can be completed on a communication page, as long as the communication page for the user B is entered. Furthermore, an expedited processing page is accessed through the communication page, and thereby other functions related to the user B (for example, a group processing function such as approval) can be completed on the expedited processing page, without the need of repeatedly switching between function pages such as the communication function and the group processing function. This greatly simplifies operations of the user, and improves processing efficiency.

As shown in FIG. 4, various types of historical events can be included in the expedited processing page. The preset events that are shown in FIG. 4 are described in detail hereinafter from multiple perspectives.

1) Way of Creating a Preset Event

For sake of description, an example of notifying preset events to the DING Talk client of the electronic device of the user A after the DING Talk server determines the preset events related to the peer communication party is used.

In implementations, the DING Talk server may record preset events associated with each user separately for each DING Talk client used by the respective user. For the user A, the DING Talk server may select preset events that are of a preset type and are related to the user B which acts as the peer communication party from among recorded historical events, and push the selected preset events to the DING Talk client of the electronic device of the user A.

For example, as shown in FIG. 4, when the user B creates an order on "07/25 15:25", the DING Talk server can record such historical event as "07/25 15:25 B created an order". Therefore, when the user A opens the expedited processing page as shown in FIG. 4, such historical event can be displayed in the expedited processing page as a preset event as described above.

In another embodiment, the DING Talk server may create a preset event related to the peer communication party according to a customizing operation of the local communication party in the expedited processing page.

For example, a "⊕ Add visit record" option may be included in the expedited processing page as shown in FIG. 4, so that the user A can trigger the option to create a visit record related to the user B, and use the visit record as a customized preset event associated with the user B. In practice, since the "visit" is done face-to-face by the user A and the user B, the DING Talk server cannot automatically make a record. Therefore, the user A can actively create a corresponding preset event through an option of customization as described above. Apparently, the present application does not impose any limitations on a type of option of customization. Any preset event that the DING Talk server can or cannot record can be customized and created by the user A in a similar manner.

Apparently, in addition to manual addition, for a preset event that the user A thinks is not important, such preset event may also be deleted from the expedited processing page, so that only historical events that are of interest and important to the user A are displayed in the expedited processing page, to facilitate the user A to view and manage thereof.

2) Associated Users of Preset Events

In implementations, an associated user of preset event(s) of the peer communication party may include the peer communication party himself/herself only. For example, as shown in FIG. 4, the expedited processing page includes a preset event of "07/25 15:56 B modified contact method", and the preset event is only related to the user B himself/herself.

In another embodiment, the preset events may include a first type of event between the local communication party and the peer communication party. In other words, associated users of the first type of event are the local communication party and the peer communication party. For example, as shown in FIG. 4, the expedited processing page includes a preset event of "08/10 15:08 B created an order", the preset event is triggered by an order creation operation of the user B. The order needs to be handled by the user A. Therefore, the preset event is associated with the user A and the user B at the same time.

In still another embodiment, the preset events may include a second type of event between another communication party and the peer communication party, wherein the local communication party has a browsing permission for the second type of event. In this case, associated users of the second type of event are the other communication party and the peer communication party. For example, as shown in FIG. 4, the expedited processing page includes a preset event of "07/22 13:56 C and B conducts communications via a designed telephone line". The preset event is a communication event between the user B and the user C, and thus is associated with the user B and the user C at the same time.

In an exemplary scenario, the local communication party and the other communication party belong to a same group, and group ownership information of the local communication party is not consistent with that of the peer communication party. In other words, the user A and the user C are both assumed to belong to an enterprise AA, and the user B belongs to an enterprise BB. In other words, the user B belongs to an "external contact" as shown in FIG. 4 for the user A and the user C. For example, the user A and the user C are salespersons of the enterprise AA, and the user B is purchasing personnel of the enterprise BB. By adding the user B as an external contact in DING Talk, the user A and the user C can achieve fast communications through DING Talk, thereby saving communication costs and improving communication efficiency.

Figure 5:
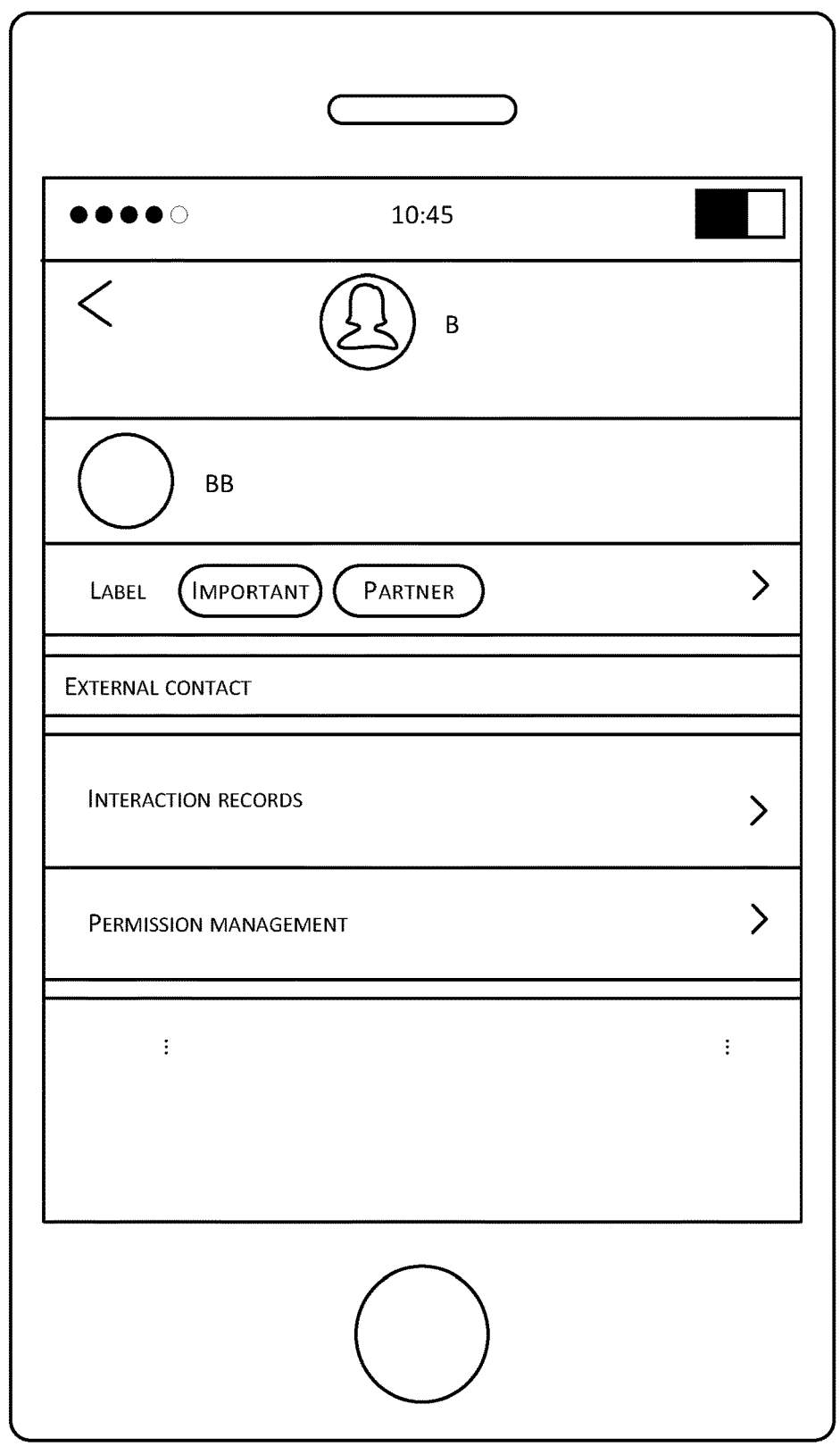
Figure 6:
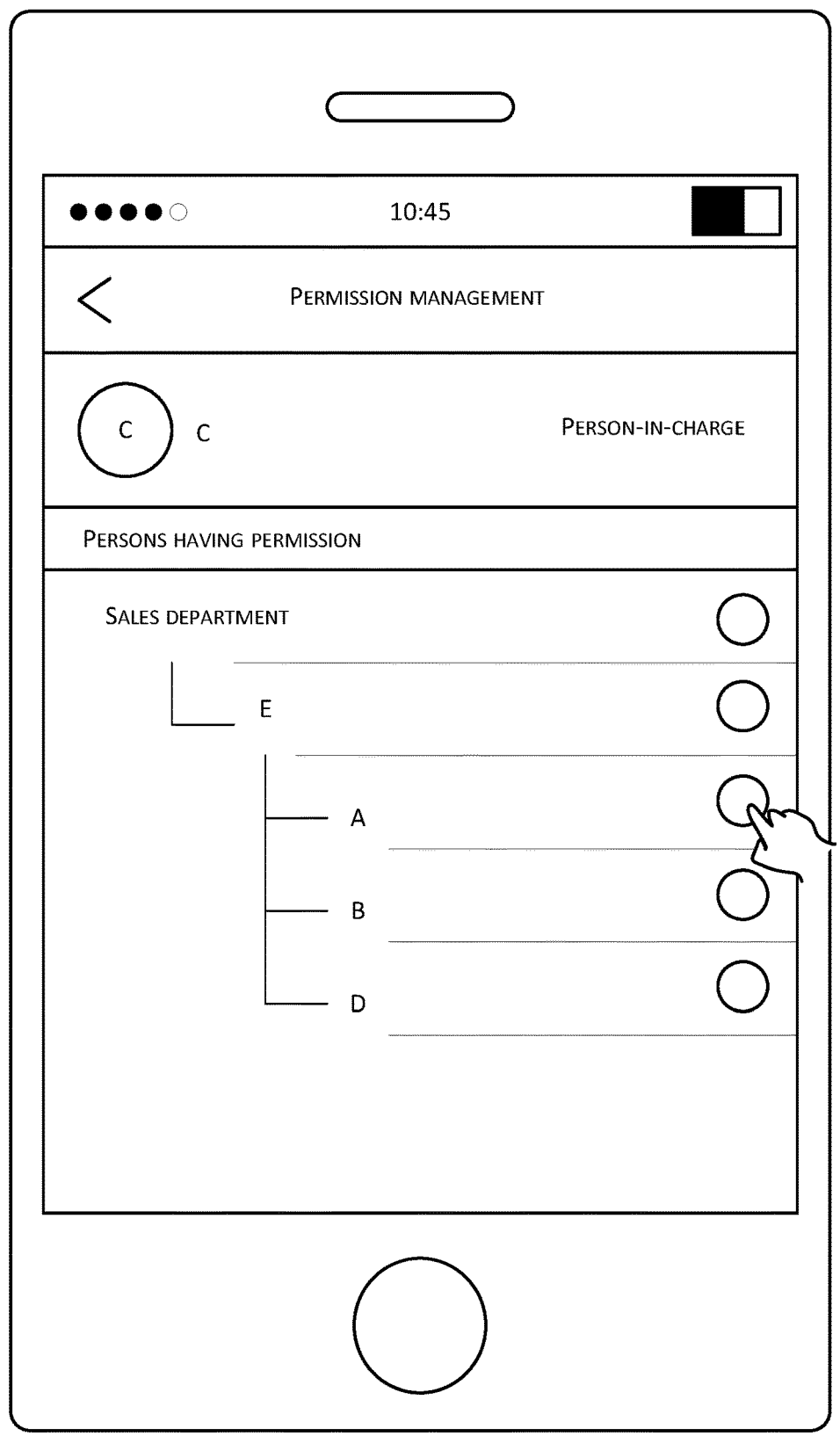
Figure 7:
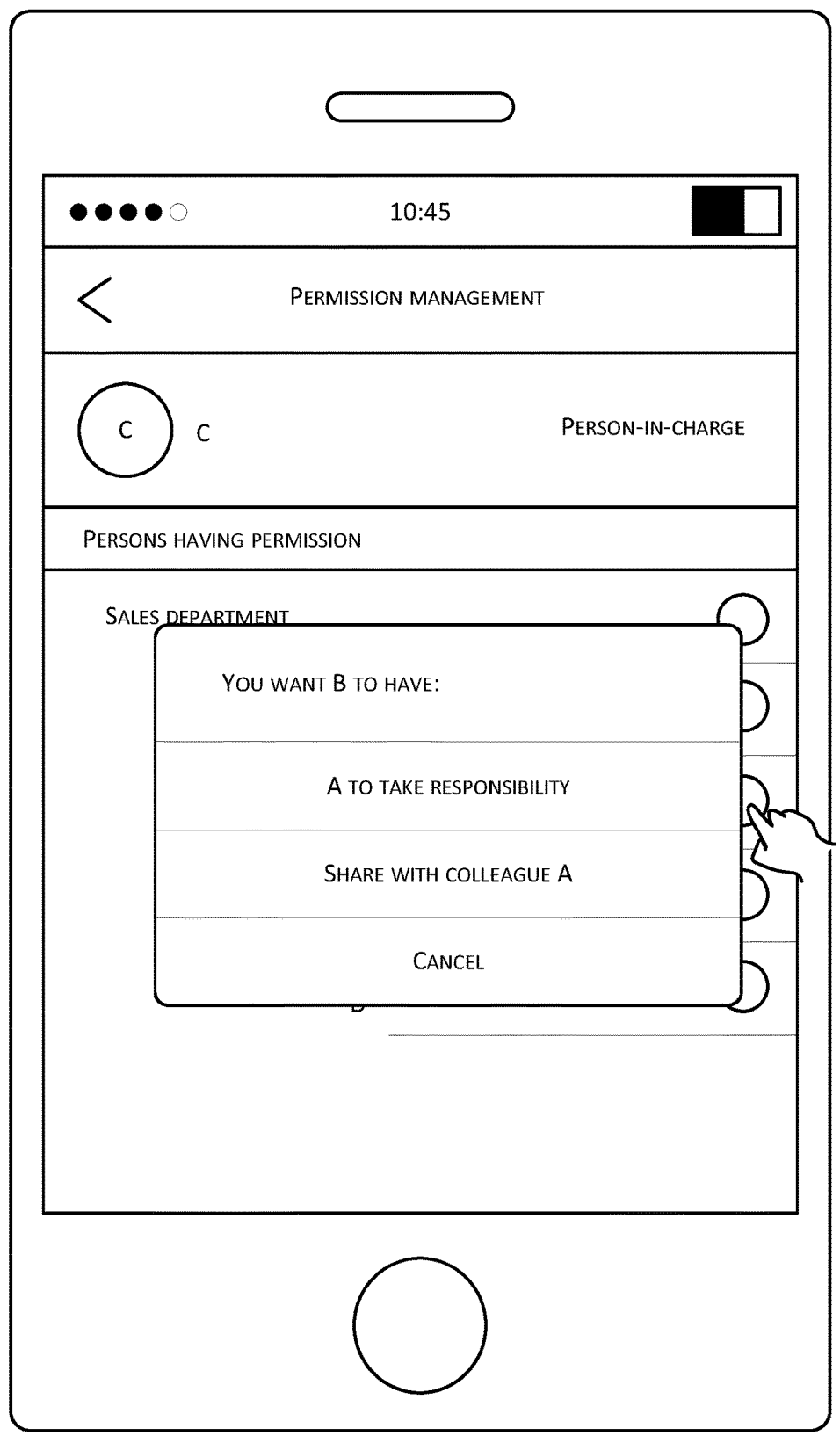

In this case, the user C and the user B are assumed to have made connections at the beginning. Therefore, based on operation activities of the user C, communications between the user C and the user B, etc., sequentially form events of a second type, such as "07/15 10:30 C adds B as external contact", "07/15 10:30 C marks B as . . . " as shown in FIG. 4. When the user C cannot continue to connect with the user B to complete the sales due to resignation or the like, FIG. 5 shows a "permission management" entry in a contact information page of the user B (apparently, the entry may also be located in other manners, other locations, which are not limited by the present application). The user C can enter a permission management page shown in FIG. 6 through the entry, and select another user that he/she wants to replace himself/herself in the permission management page. For example, when the user C selects the user A by selecting "transfer responsibility to A" in a menu window shown in FIG. 7, the user A can thus be allowed to continue to implement sales interactions with the user B, and replaced as "current complex person" as shown in FIG. 6. Apparently, such process can be recorded as a preset event of "08/08 15:45 C resigns, A takes over to deal with B" as shown in FIG. 4. As such, the user A obtains a browsing permission of the second type of event. In other words, the local communication party obtains the browsing permission for the second type of event when assigned to replace to the other communication party to communicate with the peer communication party.

Apparently, the local communication party can also obtain the above browsing permission by other means. For example, the user C is assumed to select the user D in FIG. 6, a formed menu window may include "transfer responsibility to D" and "share with colleague D" options similar to those shown in FIG. 7. When the user C selects the "share with colleague" option, the user D can obtain a browsing permission for the second type of event between the user C and the user B, and the user D does not need to be responsible for sales interactions with the user B. The above process can be recorded as a preset event of "08/08 12:02 C shares B to D" as shown in 4. In other words, the local communication party can be given the rights to browse the second type of event by the other communication party.

In addition, when the local communication party and the other communication party are in a group scenario, the above browsing permission can be obtained when a group management level of the local communication party is higher than that of the other communication party. For example, when the user E and the user C belong to the sales department of the enterprise AA, and the user E is the department head of the sales department, a determination can be made that a group management level of the user E is higher than that of the user C, because DING Talk can obtain enterprise architecture information of the enterprise AA. Therefore, different from the manner in which the user A and the user D obtain the browsing permission, the user E can directly obtain the browsing permission of the second type of event between the user C and the user B, without the need of the user C to transfer the responsibility or allocate the permission. Similarly, the user C can also obtain a browsing permission of a second type of event between other department members (such as the user A, the user D, etc.) and the purchasing personnel such as the user B. Details thereof are not repeatedly described herein.

In this case, the user A is assumed to be a person in charge of the user B in the embodiment shown in FIG. 4. The user D obtains a browsing permission granted by the user C, and the user E obtains a browsing permission as the department head. Therefore, "this information is only visible to D, E" can be displayed at the bottom of the expedited processing page as shown in FIG. 4, to send a prompt to the user A, to provide a better sense of information security to the user A.

3) Applicable Scenarios for Preset Events

In implementations, the technical solutions of the present application are applicable to communication scenarios, and the preset events related to the peer communication party may include a communication event related to a communication activity. Furthermore, the communication event may include multiple types, such as a call event, a contact addition event, etc.

For example, as shown in FIG. 4, the expedited processing page includes the following event "07/22 13:56 C communicates with B via designated telephone line", i.e., a call event between the user C and the user B. Similarly, any type of communication event other than a call, such as an instant messaging event, a mail communication event, etc., can generate a corresponding communication event, which is not limited in the present application.

In the expedited processing page shown in FIG. 4, the following preset event "07/15 10:30 C adds B as an external contact" may also be included, i.e., a preset event about the user C adding contact information of the user B to an address book. In practice, the user C can complete the above-mentioned call event or other event only after a contact addition event is completed, and thus the contact addition event belongs to the above communication event. Apparently, in addition to communication events in a cross-group scenario shown in FIG. 4, the above communication scenarios are also applicable to any other situations, for example, a corresponding group communication event when the local communication party and the peer communication party belong to a same group, or a corresponding communication event that is not related to a group when the local communication party and the opposite communication party do not belong to any group.

In another embodiment, the technical solutions of the present application may be applied to group processing scenarios, such as an enterprise management scenario. The preset events related to the peer communication party may include a group processing event related to a group processing function when the group processing function is included in the communication application corresponding to the communication page.

Figure 8A:
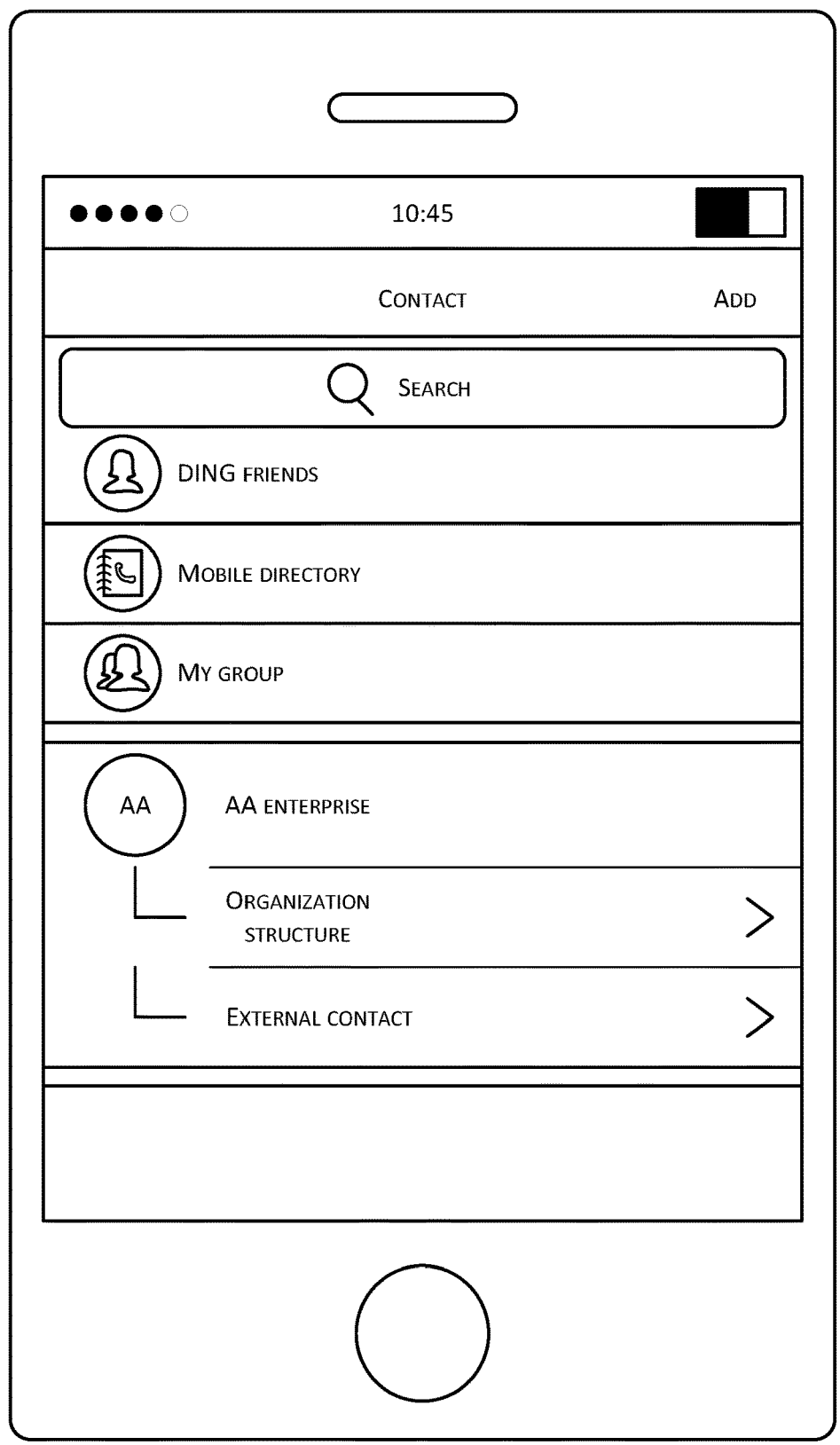

If the user A is assumed to belong to the AA enterprise, the address book supported by the DING Talk as shown in FIG. 8A not only includes contact information that is not related to groups such as "DING Talk friends", "mobile phone address book", "my group", etc., but also includes contact information in group scenarios related to the AA enterprise, such as contact information within groups of the AA enterprise corresponding to "organizational structure", and "external address book" corresponding to groups external to the AA enterprise (i.e., contact information that does not belong to the AA enterprise).

Figure 8B:
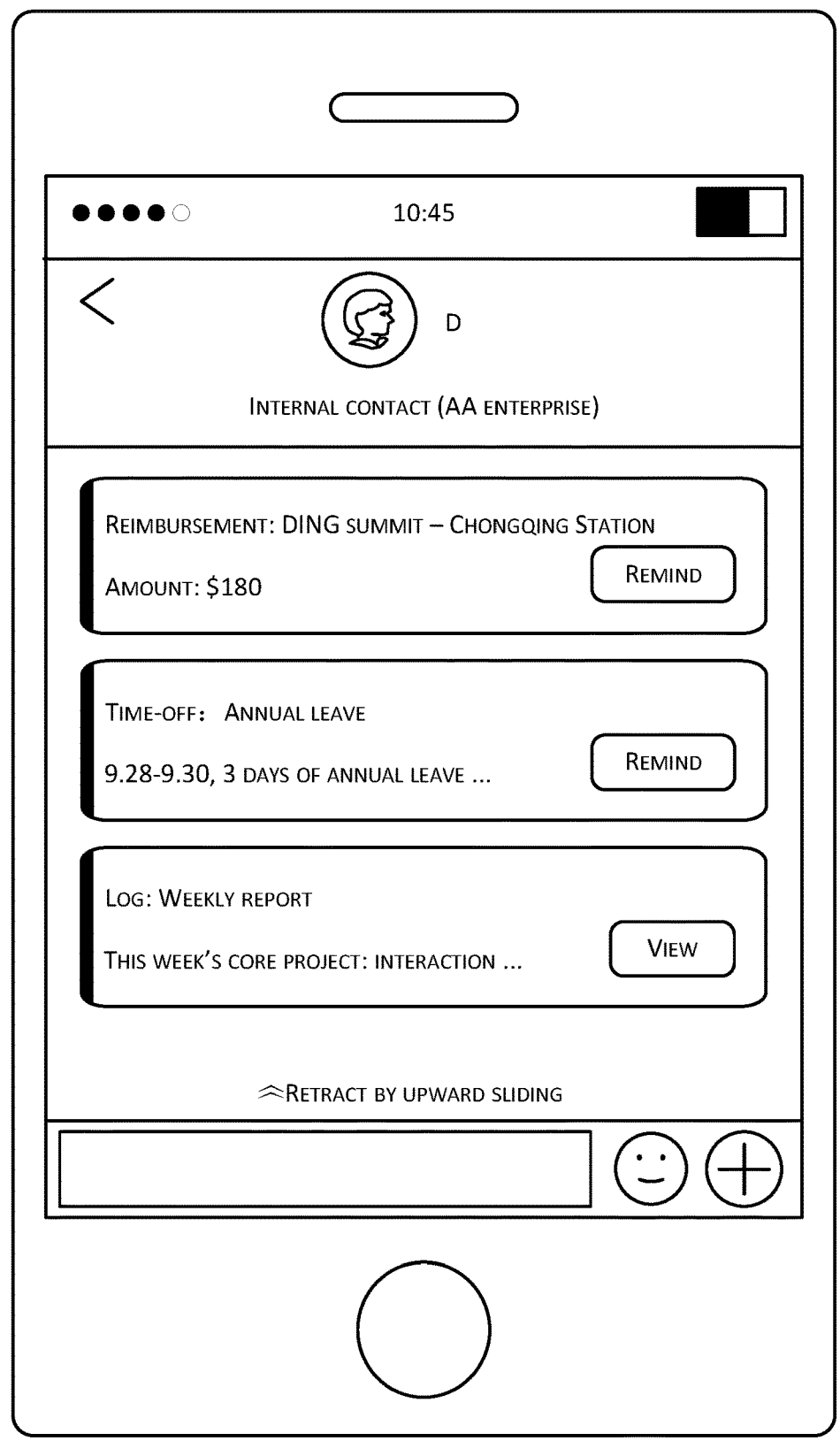

If both the user A and the user D are employees of the sales department of the AA enterprise, i.e., the user D is an internal contact of the user A. In this case, the user A can call an expedited processing page as shown in FIG. 8B through a communication page with the user D. The expedited processing page includes preset events related to the user D, and the preset events include a group processing event. For example, as shown in FIG. 8B, the expedited processing page may include a historical event of "reimbursement: DING Summit—Chongqing Station . . . " for a group processing function "reimbursement approval", a historical event of "time-off: annual leave . . . " for a group processing function "time-off for approval", a historical event of a "log: weekly report . . . " of a group processing function "project weekly report".

In practice, although a communication application in related technologies includes multiple group processing functions, each group function is independent of each other. A user needs to find and start a corresponding function entry, so that group processing events can be viewed and processed on a corresponding function page, and thus a process thereof is very complicated. Using the technical solutions of the present application, the user A can conveniently call up an expedited processing page shown in FIG. 8B through a communication page with the user D, and a centralized display is performed on various group processing functions in the expedited processing page. The user A can directly perform operations, such as viewing and processing, on group processing events that are displayed, greatly simplifying user operations and improving the processing efficiency of related preset events.

By comparing the expedited processing page in the cross-group scenario shown in FIG. 4 and the expedited processing page in the intra-group scenario shown in FIG. 8B, different presentation modes of preset events can be employed in different scenarios in the present application.

When respective group ownership information of the local communication party and the peer communication party is inconsistent, i.e., corresponding to the cross-group scenario shown in FIG. 4, the preset events displayed on the expedited processing page may include all preset events of a preset type that are related to the peer communication party, so that the local communication party can know conditions of the peer communication party in a timely and comprehensive manner.

When respective group ownership information of the local communication party and the peer communication party is the same, i.e., in the intra-group scenario shown in FIG. 8B, there is no need to browse preset events understand the other party because the local communication party and the peer communication party belong to a same group. Therefore, the preset events displayed in the expedited processing page may include a preset type of preset events to be processed that are related to the peer communication party, such as an unresolved reimbursement event, a request approve event, and a project weekly report event in FIG. 8B to improve the convenience of mutual collaboration between users within the group, thereby increasing work efficiency.

It should be noted:

Other than scenarios such as cross-group and intra-group, the technical solutions of the present application can also be applied to scenarios that are not related to a group. If the user A and the user G do not have an external customer relationship and an internal colleague relationship, but simply have a friend relationship, the user A can then call up an expedited processing page shown in FIG. 9 through a communication page with the user G. The expedited processing page can include preset events of a preset type that are related to the user G, for example, a historical event of establishing a friend relationship "07/15 10:30 scan code to add G as a friend", a monumental historical event "07/22 13:56 a call duration with G reaches 100 minutes", etc., which can represent a development history of the friend relationship between the user A and the user G, thus helping to improve the user experience.

Operation 206B: Detect that an arbitrary preset event is generated.

Operation 208B: Display the arbitrary preset event.

In implementations, when the communication page is in the open state, if an arbitrary preset event that occurs in real time is detected, the arbitrary preset event may be displayed in the expedited processing page, so that the user can view and process thereof in time.

Figure 9:
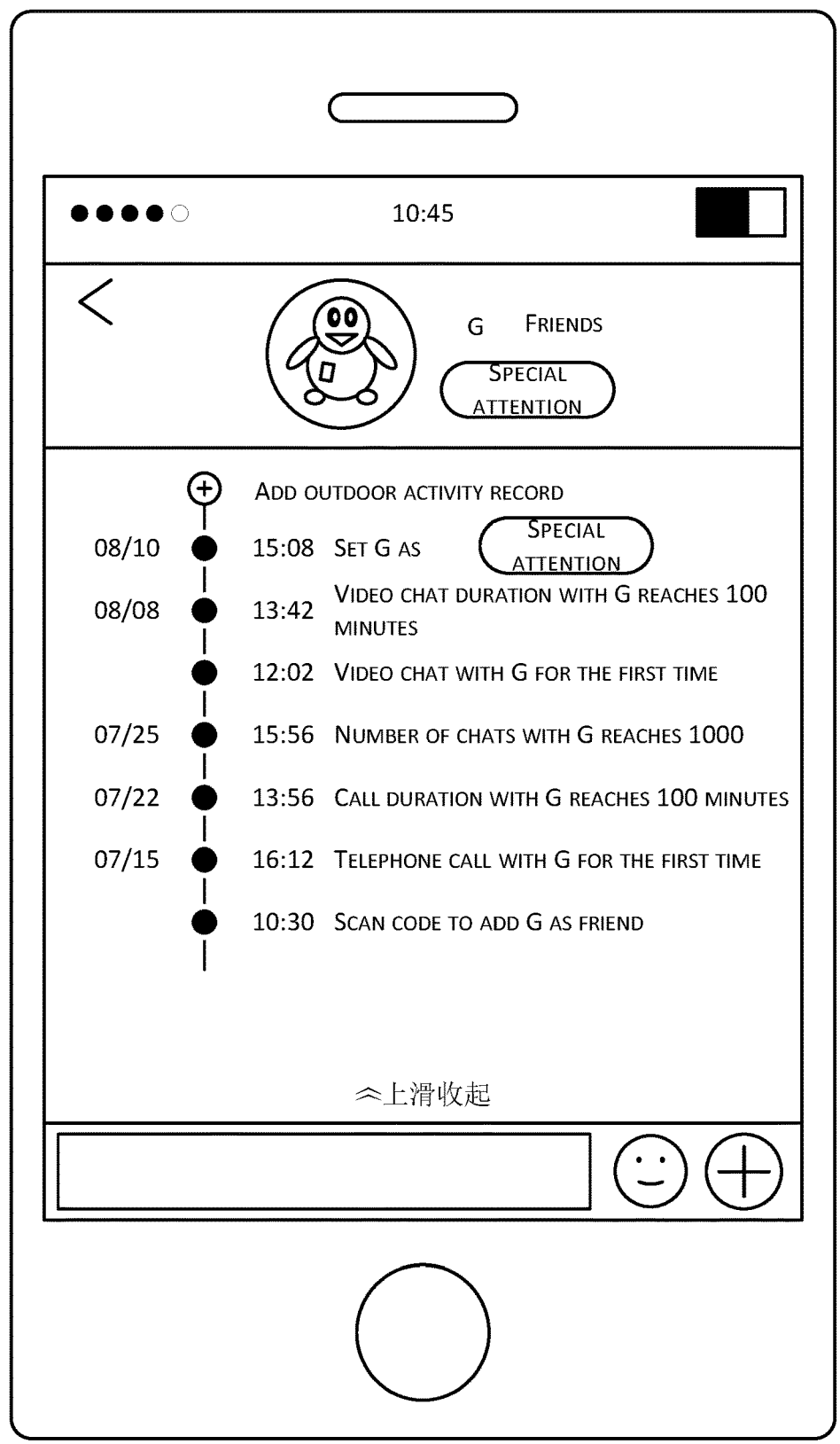

In one case, when the arbitrary preset event occurs, the local communication party manually triggers from the communication page (for example, performing a downward sliding gesture) and calls up the expedited processing page as described above when the expedited processing page is displayed in the detail mode as shown in FIG. 4, FIG. 8B or FIG. 9. As such, all preset events (all preset events conforming to the preset type, e.g., all preset events that are to be processed for the intra-group scenario shown in FIG. 8B) are displayed on the expedited processing page in a centralized manner. In this case, these preset events can be directly arranged in the expedited processing page, for example, arranged on top of all the preset events in the expedited processing page according to a time sequence.

Figure 10:
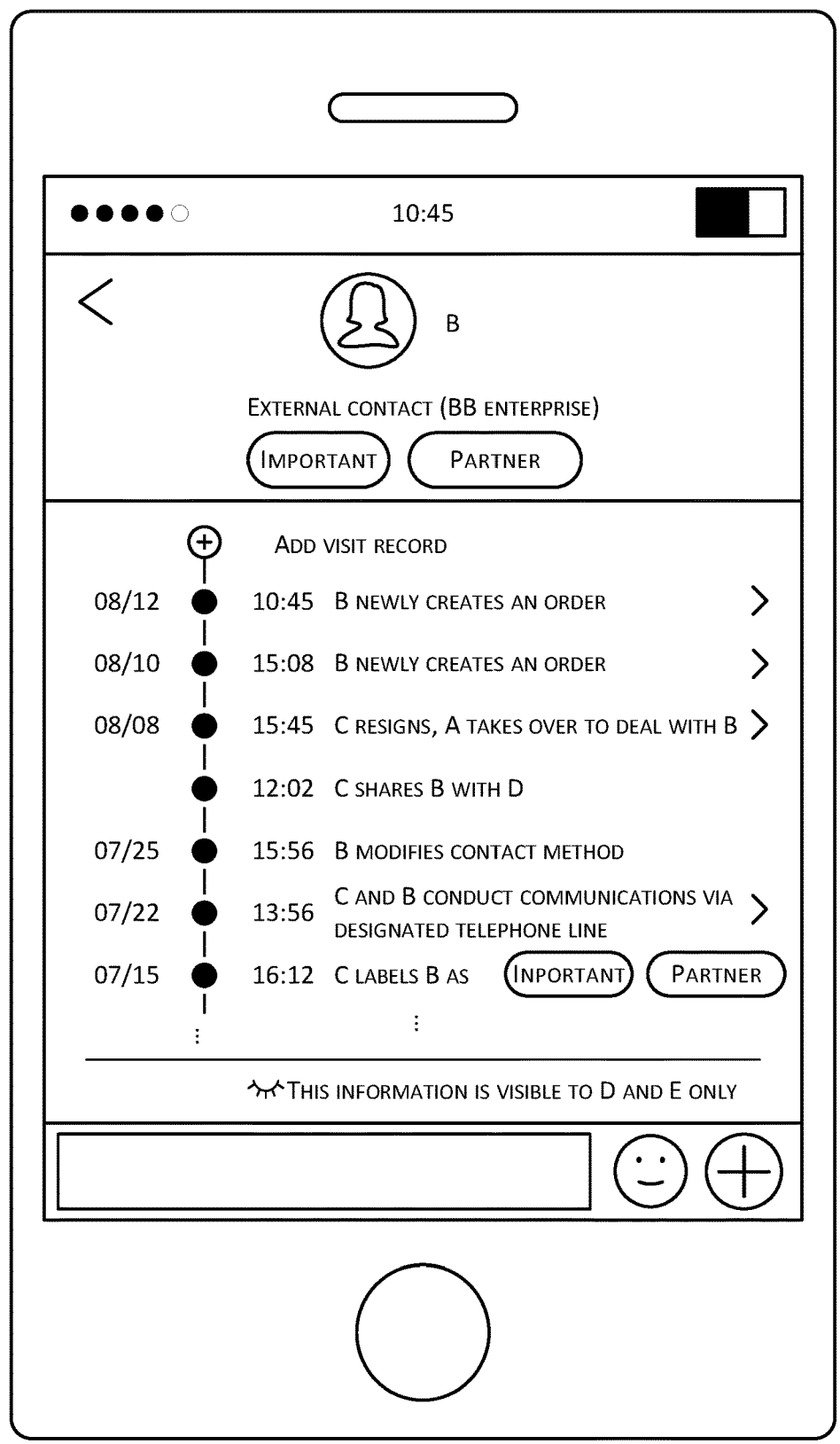

For example, the current time and date is assumed to be "08/12 10:45", and the expedited processing page shown in FIG. 4 is taken as an example. If the user B creates an order here to form a corresponding preset event, the corresponding preset event can be displayed at the top of all preset events in the expedited processing page, and thereby an expedited processing page as shown in FIG. 10 is obtained.

In another case, when the arbitrary preset event occurs, and the expedited processing page is in a hidden state, i.e., at the communication page shown in FIG. 3 at this time, an abbreviated mode may be used to display the expedited processing page. Description information of the arbitrary preset event is displayed on the expedited processing page in the abbreviated mode.

Figure 11:
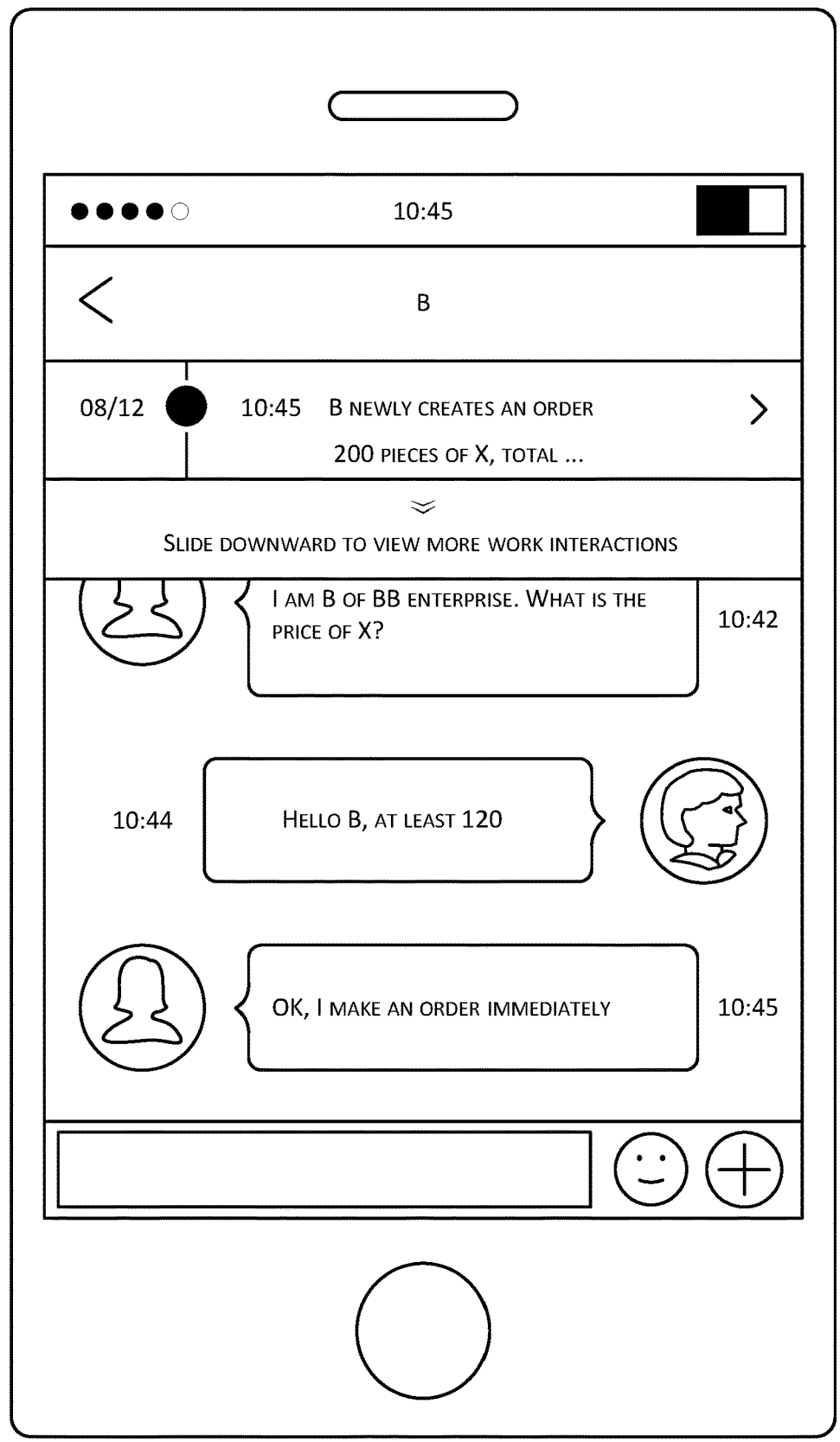

For example, as shown in FIG. 11, the expedited processing page in the abbreviated mode may be a temporary window in the communication page, and is only used for displaying the arbitrary preset event currently generated, so that the user can find, view, and process the arbitrary preset event in time, thus helping to improve the processing efficiency.

In addition, the detail mode and the abbreviated mode of the expedited processing page can also be applied to different display requirements for preset events. For example, when the expedited processing page is displayed in the detail mode, all preset events can be collectively displayed on the expedited processing page. When the expedited processing page is displayed in the abbreviated mode, preset events to be processed among the preset events can be displayed in the expedited processing page. Therefore, in the detail mode, the local communication party can browse all the preset events to fully understand conditions with the peer communication party. In the abbreviated mode, the local communication party is enabled to view and process the preset events to be processed in time under the circumstance that communication operations between the local communication party and the peer communication party is minimized, thus helping to simplify user operations and improve the processing efficiency.

Operation 210: Detect a triggering operation on a preset event.

Operation 212: Perform a preset operation on the triggered preset event.

In implementations, when a triggering operation of the local communication party for any preset event in the expedited processing page is detected, a preset operation for the any preset event may be performed. In this case, since finding a function entry corresponding to the any preset event and switching to a corresponding function page are not needed, user operations can be simplified, and the processing efficiency can be improved.

For different types of preset events, corresponding methods of processing can be adopted. The following examples are given for description.

In implementations, for a preset event of a browsing information category, such as a communication event, a log weekly report event, etc., a detail page of such preset event may be called, and detailed content of such preset event is displayed in the detailed page.

Figure 12:
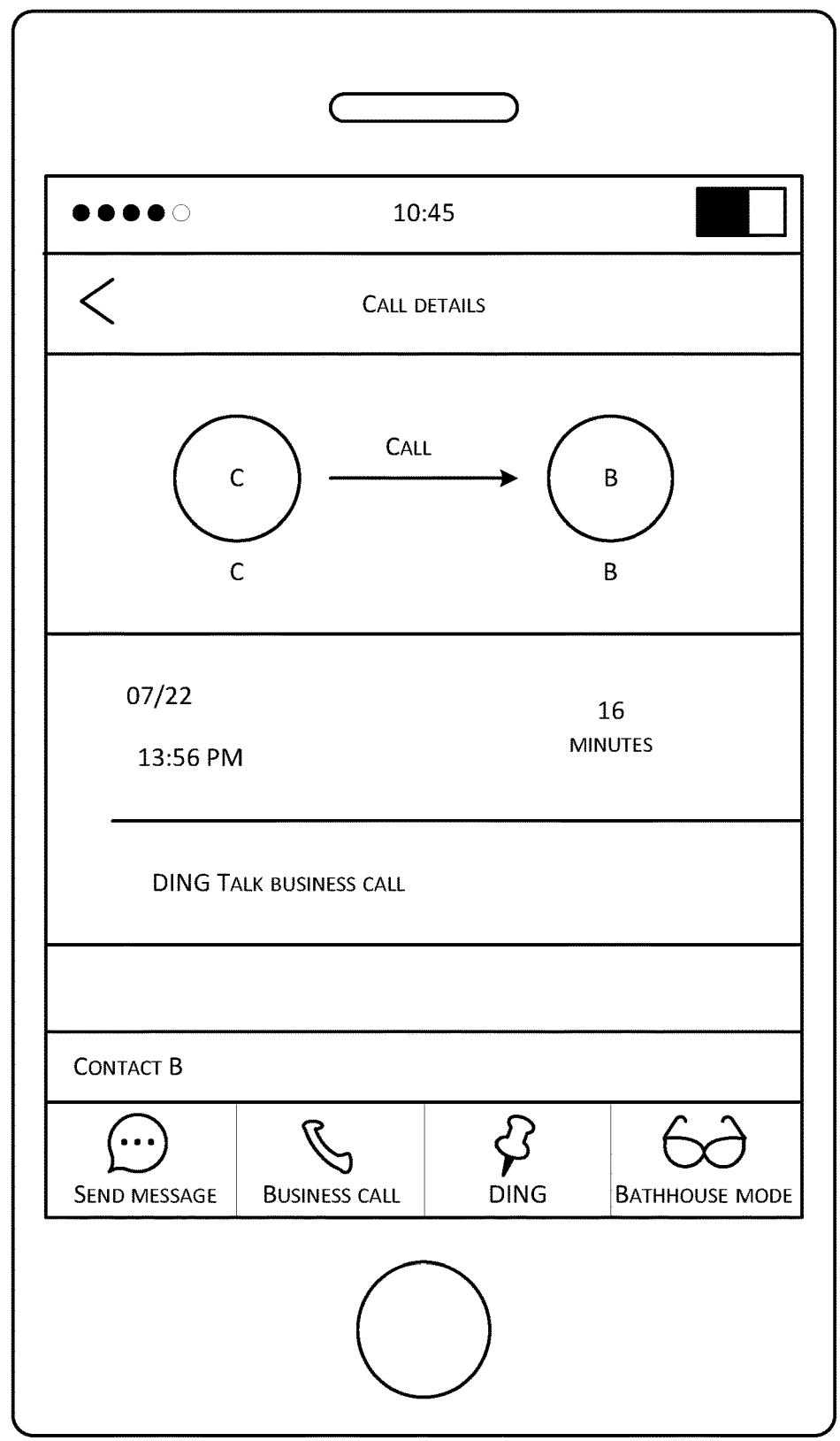

For example, when the user A clicks on the preset event of "07/22 13:56 C and B conduct communication via designated telephone line" as shown in FIG. 4, a jump to a detail page as shown in FIG. 12 can be made, and information of the preset event, such as a duration, a call direction, and a call mode, etc., is displayed for the user A to browse and view.

In another embodiment, for a preset event to be processed, such as a reimbursement approval event, a time-off approval event, etc., different processing methods may be adopted according to role types of the local communication party and the peer communication party.

When the local communication party is an initiating party of the preset event and the peer communication party is a processing party, a reminder message for the preset event may be sent to the peer communication party. For example, as shown in FIG. 8B, the user A is assumed to initiate a reimbursement approval event to the user D. By displaying the reimbursement approval event in the expedited processing page as shown in FIG. 8B, and configuring a function option such as "remind" in the reimbursement approval event, the user A is enabled to send a reminder message to the user D who acts as the processing party by directly triggering the "remind" function option. For example, when DING Talk is used, the reminder message can be a DING message. DING Talk can send the DING message to the peer communication party user D who acts as the processing party through at least one of a plurality of means, such as an instant messaging message, a short message, and a voice call.

Figure 13:
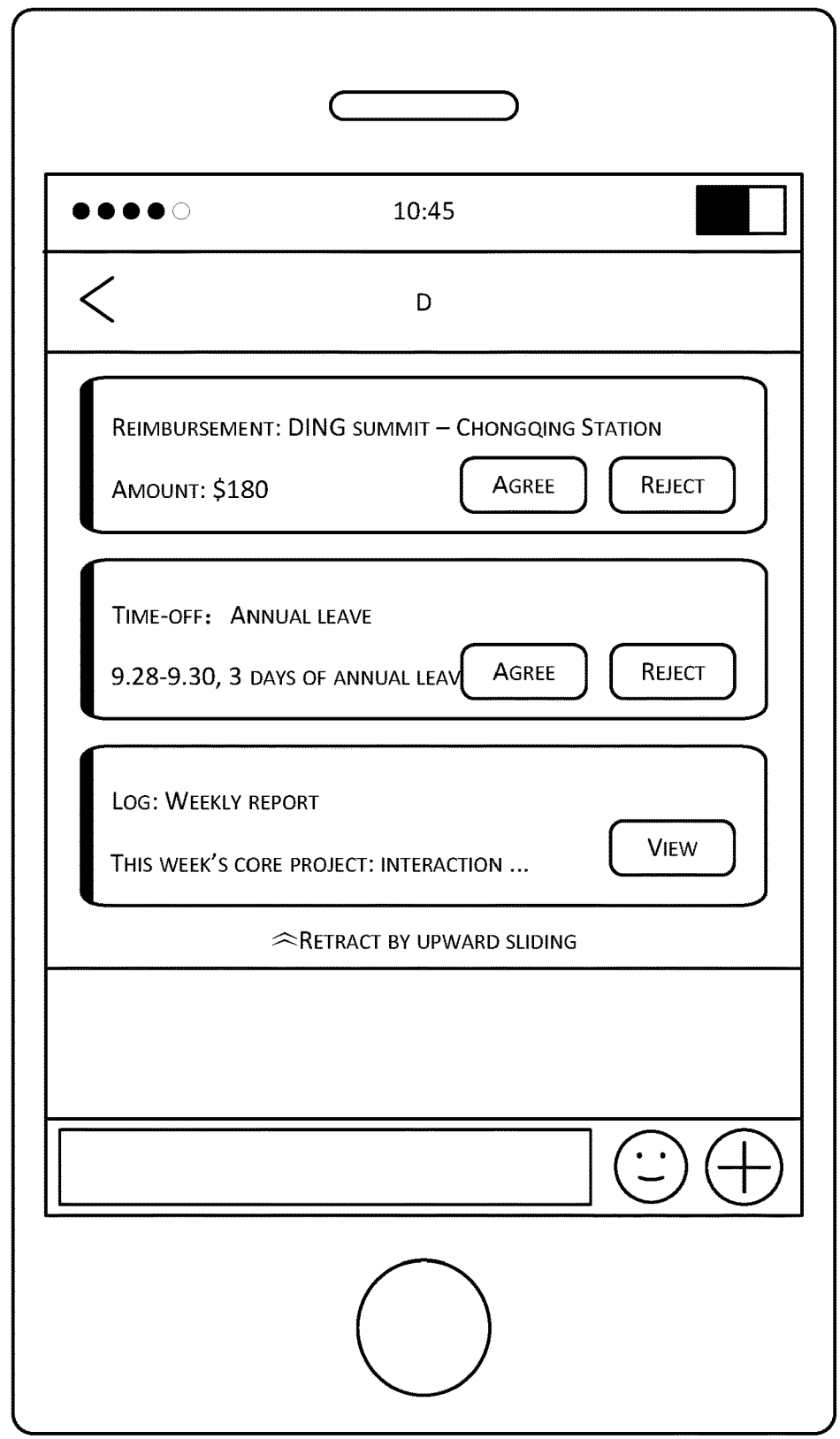

When the local communication party is a processing party of the preset event and the peer communication party is an initiating party, a preset processing may be performed on the preset event. For example, as shown in FIG. 13, the user A is assumed to receive a reimbursement approval event initiated by the user D. In this case, by displaying the reimbursement approval event in the expedited processing page as shown in FIG. 8B, and configuring function options such as "agree", "reject", etc., in the reimbursement approval event, the user A can be enabled to directly trigger the function option "agree" or "reject", thereby agreeing or rejecting an approval of the reimbursement approval event without switching to a designated reimbursement approval function page for processing.

Apparently, the local communication party can also switch to a corresponding function page by clicking the preset event, and view and process the preset event in detail. As such, even if a function option of the preset event is not displayed in the expedited processing page, collectively displaying the preset events and a quick jump to a function page are equivalent to integrating entrances of a number of function pages on the expedited processing page, so that the local communication party does not need to look up and find an entrance of the function page, thus still improving the operating efficiency of the user.

In still another embodiment, when a triggering operation of the user on any preset event in the expedited processing page is detected, corresponding historical communication message(s) may be displayed in a corresponding communication page, and a position of the any preset event is automatically located within the historical communication message(s). This helps the user to quickly and conveniently view the context, and a related time point, etc., when the any preset event occurs, without manually performing a lookup and a search.

Figure 14:
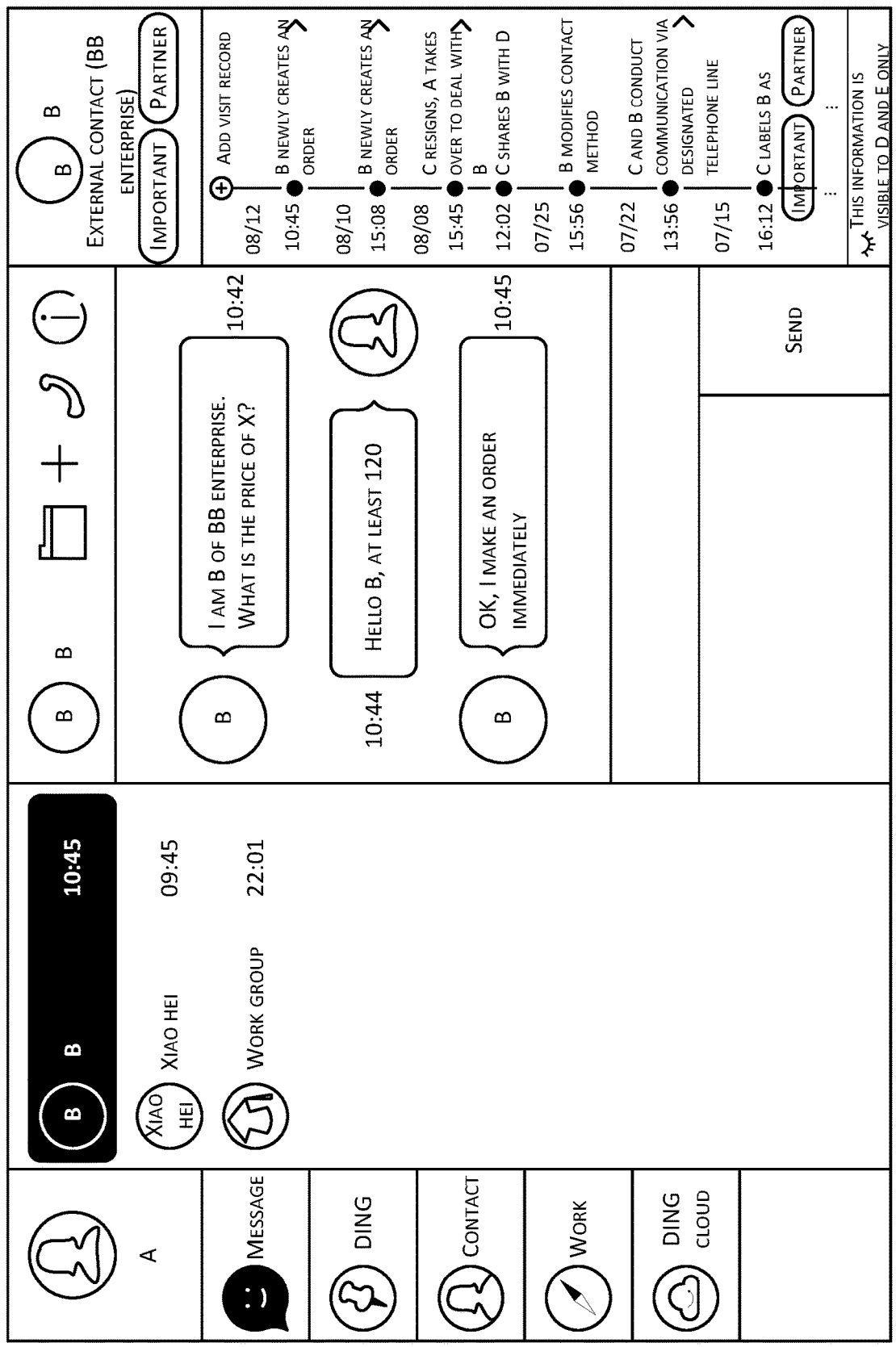

In the above embodiments, a communication page and an expedited processing page on a mobile device are taken as examples for description. In practice, since a screen size of a mobile device tends to be small, a communication page and a display area of an expedited processing page often have overlapping at least partially. On an electronic device with a large screen size, such as a PC or a large-sized tablet device, as shown in FIG. 14, a communication page and the expedited processing page can be displayed side by side. When the local communication party (the user A) opens a communication page of the peer communication party (the user B), an associated expedited processing page can be automatically and synchronously opened and displayed in the vicinity of the communication page, so that the local communication party can browse and view thereof.

Figure 15:
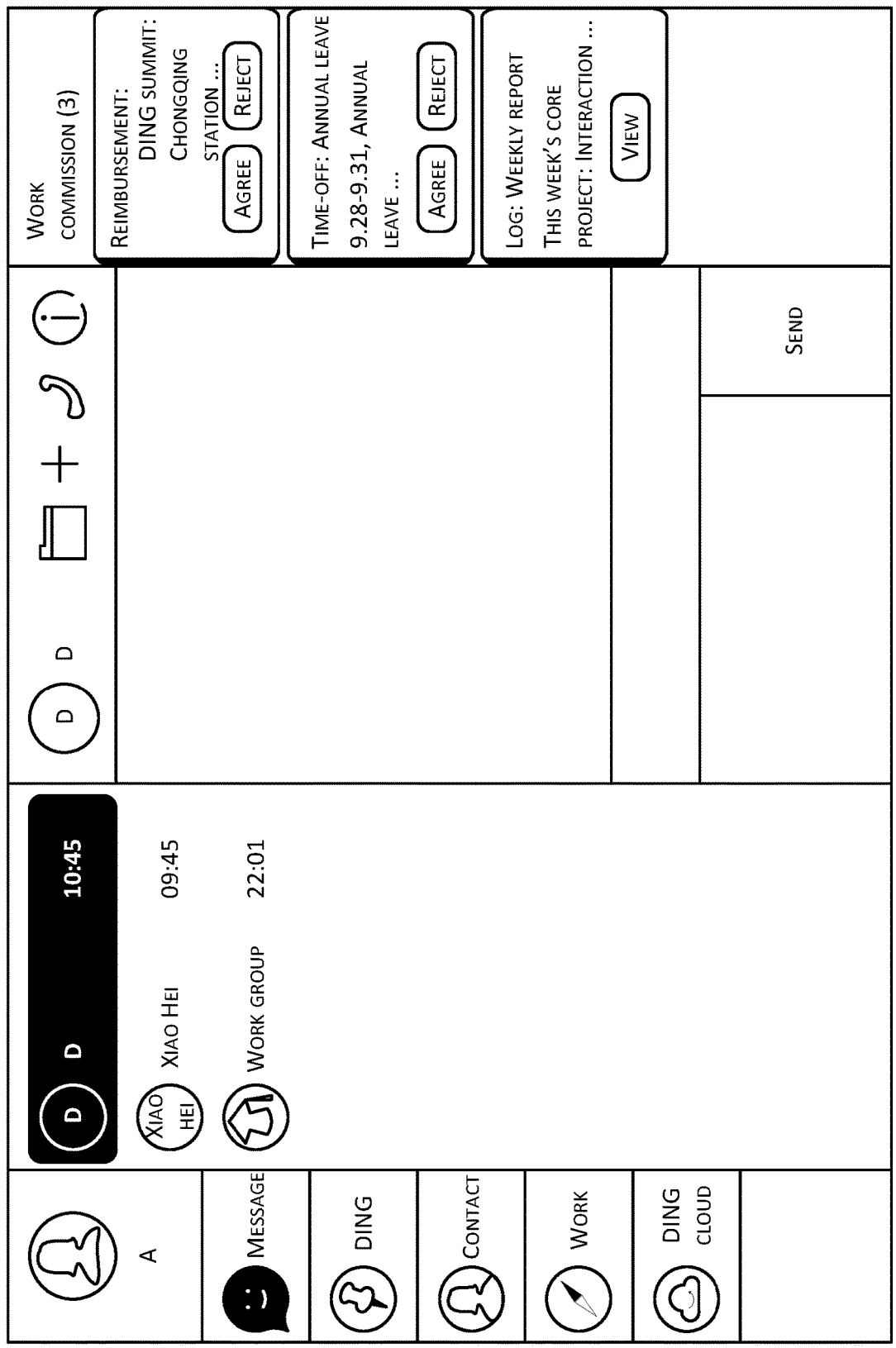

Apparently, in some scenarios, a determination can be made as to whether to synchronously display an expedited processing page with a communication page by adding a judgment on preset condition(s), for example, when a preset event that is to be processed exists between the local communication party and the peer communication party. The user A and the user D of the same enterprise are taken as an example. When the user A opens a communication page of the user D as shown in FIG. 15, If a corresponding preset event to be processed exists, an associated expedited processing page may be displayed in the vicinity of the communication page, and only the corresponding preset event to be processed is displayed in the expedited processing page. As such, the user A can quickly view and process thereof to prevent preset events that have been processed or that do not need to be processed from affecting operations of the user.

Figure 16:
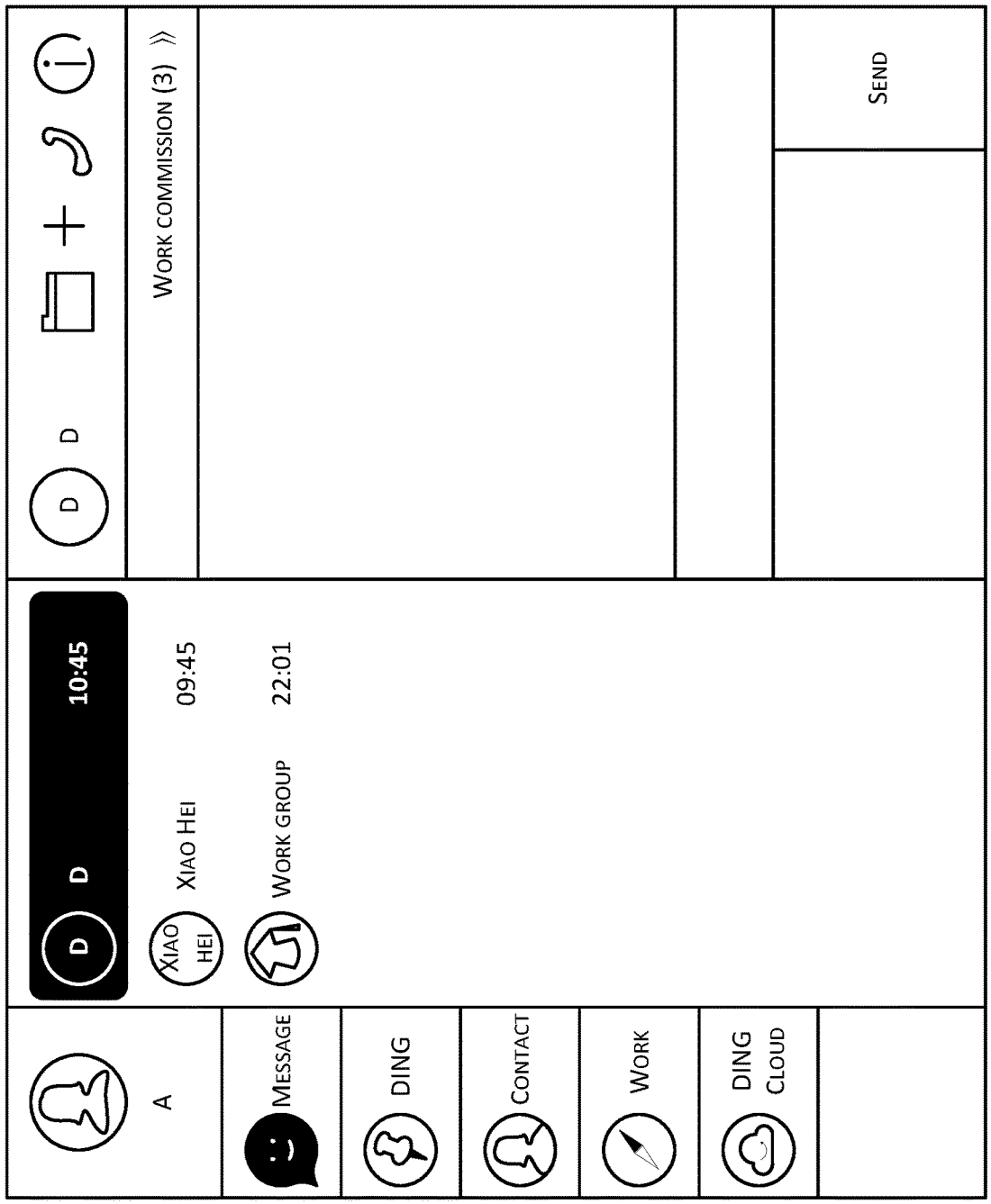

After the any preset event is processed, a display of the preset event may be cancelled from the expedited processing page. When all the preset events to be processed are processed, a display of the expedited processing page may be cancelled, i.e., the expedited processing page is switched to a hidden state. Apparently, even if a preset event to be processed still exists, the local communication party can manually close the expedited processing page. Thus, as shown in FIG. 16, "work agent (3)>>" can be displayed in the communication page, which indicates that there are still 3 preset events to be processed for the local communication party on the one hand, and acts as an entry point of the expedited processing page on the other hand, to facilitate the local communication party open the corresponding expedited processing page conveniently.

In the foregoing embodiments of the present application, as shown in schematic diagrams of FIG. 4, FIG. 9, FIG. 14, etc., a description label for a corresponding peer communication party may be displayed in the expedited processing page to mark the peer communication party. FIG. 4 is used as an example. According to a preset event of "07/15 16:12 C marks B as 'important' and 'partner'" recorded in the expedited processing page in FIG. 4, it can be known that: when the user C and the user B are connected (i.e., when the user C is the local communication party and the user B is the peer communication party), the local communication party can configure a description label for the peer communication party by issuing a label configuration command. For example, a management page of the user B as shown in FIG. 5 includes a "label" option, and the local communication party can enter a label configuration page by triggering that option, so that a description label corresponding to the peer communication party can be selected from among candidate labels, or a customized description label can be added for the peer communication party.

By adding a description label, the local communication party can generally understand conditions of the peer communication party even without the need of viewing or carefully viewing the preset events in the expedited processing page, so as to implement proper communication operations with the peer communication party as soon as possible. In particular, in a company or other group scenario when frequent resignations and turnovers of company members exist, after a former employee who acts as a customer of a peer communication party adds an appropriate description label, this helps a subsequent substituting staff to understand a situation of the peer communication party in time, and facilitates development of corresponding work.

Apparently, in addition to manual configuration by the local communication party, automatic generation and addition of a description label can also be implemented in the technical solutions of the present application. For example, by analyzing user information of the peer communication party and the preset events related to the peer communication party, a description label matching the peer communication party can be intelligently determined.

For example, the user information of the peer communication party may include a group to which the peer communication party belongs. For example, when the peer communication party belongs to the BB enterprise and the local communication party belongs to the AA enterprise, a description label of "partner" can be actively added for the peer communication party if a cooperative relationship exists between the AA enterprise and the BB enterprise. Alternatively, when the peer communication party belongs to a government agency, a description label of "government authority" can be actively added for the peer communication party.

For another example, if the peer communication party is a purchasing personnel and the local communication party is a sales personnel, the preset events related to the peer communication party may include an order placed by the peer communication party. A total amount of the order placed by the peer communication party can be calculated. When the total amount reaches a preset amount, an "important" description label can be actively added for the peer communication party.

Figure 17:
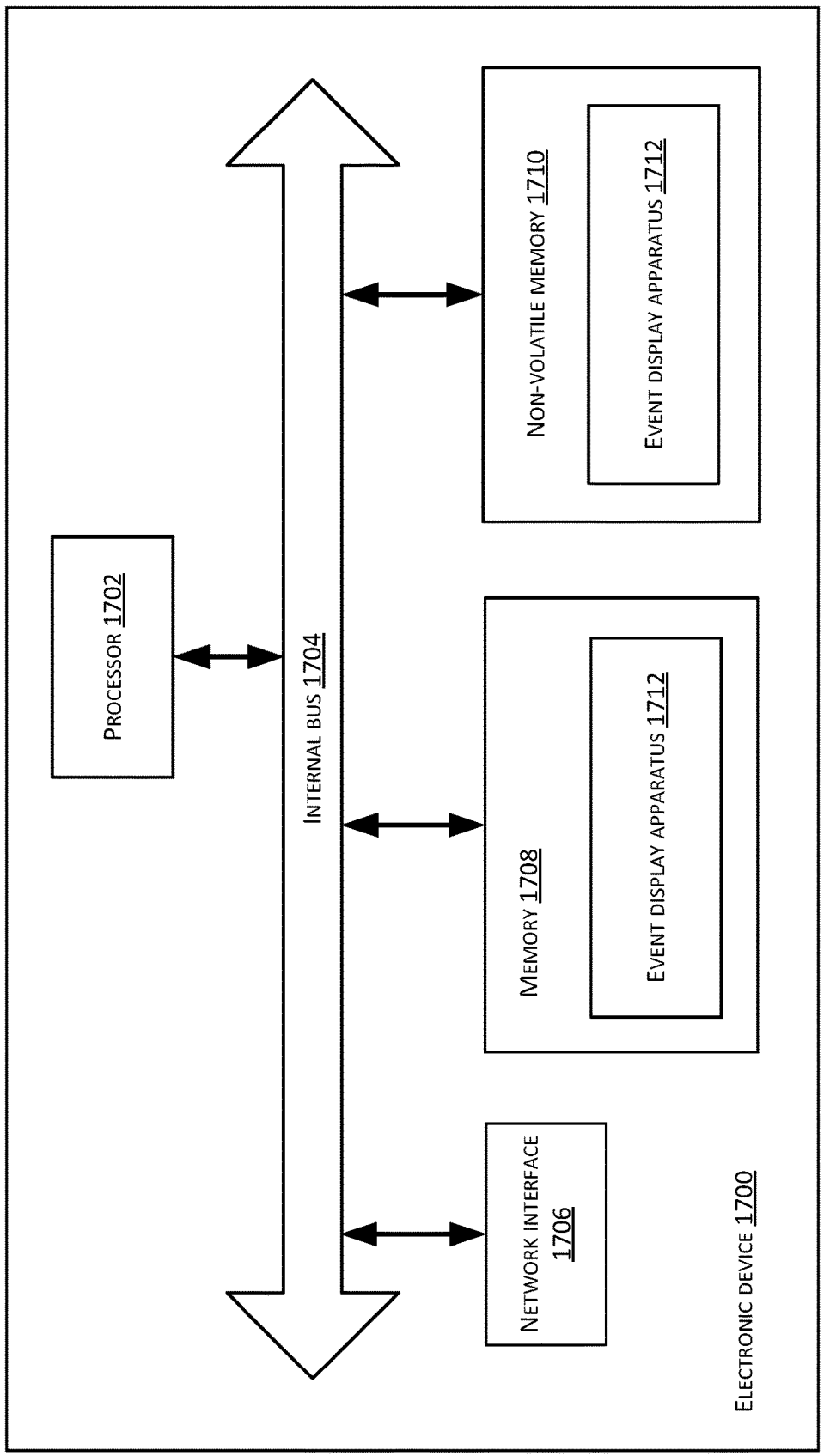
FIG. 17 is a schematic structural diagram of an electronic device according to an exemplary embodiment of the present application.

FIG. 17 shows a schematic structural diagram of an electronic device 1700 according to an exemplary embodiment of the present application. Referring to FIG. 17, at the hardware level, the electronic device 1700 includes a processor 1702, an internal bus 1704, a network interface 1706, memory 1708, and non-volatile memory 1710, and apparently may also include hardware needed by other services. The processor 1702 reads a corresponding computer program from the non-volatile memory 1710 into the memory 1702, and then runs to form an event display apparatus 1712 at a logical level. Apparently, in addition to software implementations, the present application does not exclude other manners of implementation, such as a logic device or a combination of software and hardware, etc. In other words, an execution entity of the following flow of processing is not limited to each logical unit, and may be a hardware or logic device.

Figure 18:
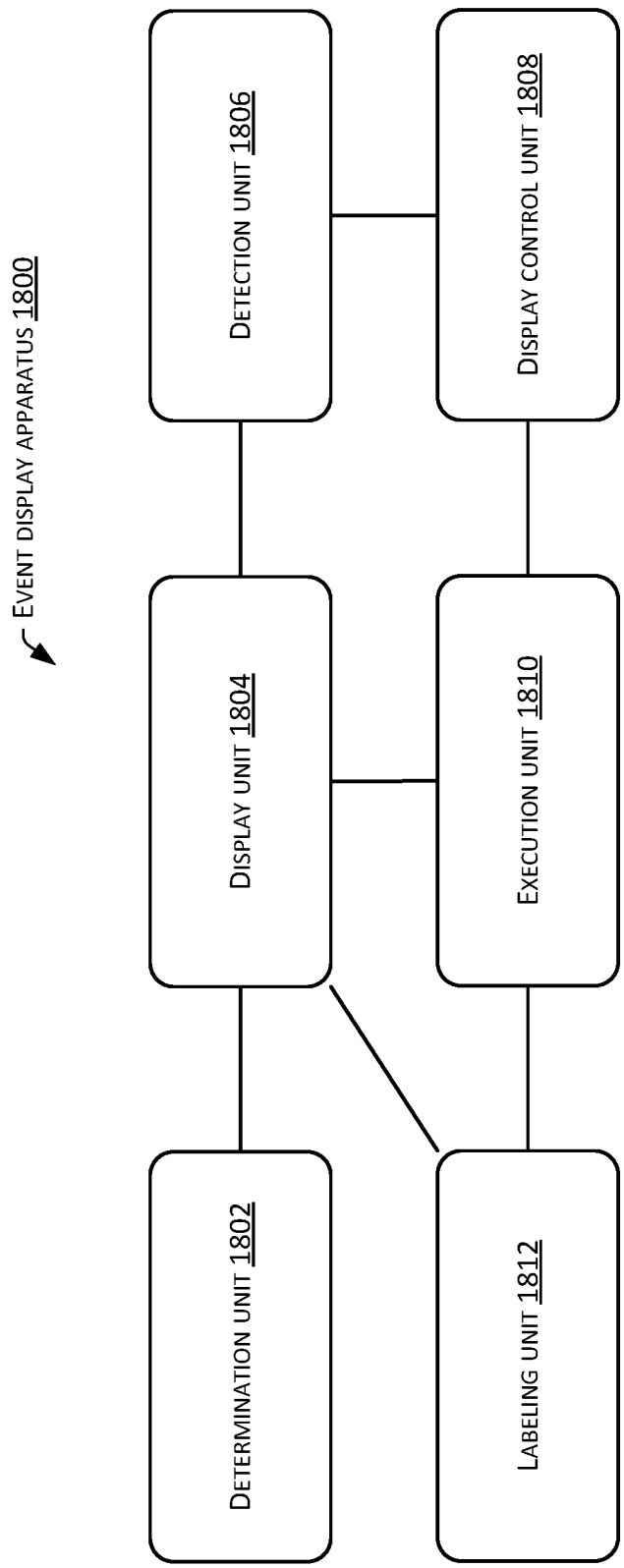
FIG. 18 is a block diagram of an event display apparatus according to an exemplary embodiment of the present application.

Referring to FIG. 18, in implementations, an event display apparatus 1800 may include a determination unit 1802 and a display unit 1804.

The determination unit 1802 determines preset events related to a peer communication party.

The display unit 1804 displays description information of the preset events in an expedited processing page associated with a communication page when the communication page of the peer communication party is in an open state.

In implementations, the determination unit 1802 determines the preset events related to the peer communication party using at least one of the following manners:

selecting a preset event that is of a preset type and is related to the peer communication party from recorded historical events;

determining a preset event that is of a preset type and is related to the peer communication party from among real-time events that are detected; and creating a preset event related to the peer communication party according to a customizing operation of the local communication party in the expedited processing page.

In implementations, the preset events related to the peer communication party include a first type of event between the local communication party and the peer communication party.

In implementations, the preset events related to the peer communication party include a second type of event between another communication party and the peer communication party, where the local communication party has a browsing permission for the second type of event.

In implementations, when the local communication party belongs to a same group of the other communication party, and has group ownership information that is inconsistent with that of the peer communication party, the local communication party obtains the browsing permission through at least one of the following manners:

the local communication party obtaining the browsing permission for the second type of event when assigned to communicate with the peer communication party in place of the other communication party;

a group management level of the local communication party being higher than that of the other communication party; and the local communication party being given the browsing permission of the second type of event by the other communication party.

In implementations, the preset events include at least one of the following:

a communication event related to communication behavior; and a group processing event related to a group processing function when the community processing function is included in a communication application corresponding to the communication page.

In implementations, when group ownership information of the local communication party and the peer communication party is inconsistent, the preset events include all preset events related to the peer communication party.

When group ownership information of the local communication party and the peer communication party is consistent, the preset events include a preset event that is to be processed and related to the peer communication party.

In implementations, the display unit 1804 is specifically configured to:

synchronously display the expedited processing page to display the description information of the preset events in a concentrated manner when the communication page is detected to be in the open state; or switching the expedited processing page from a hidden state to a displayed state to display the description information of the preset events in a concentrated manner when the communication page is detected to be in the open state and a preset triggering operation for the communication page is detected.

In implementations, the display unit 1804 may be configured to:

display all the preset events on the expedited processing page in a concentrated manner when the expedited processing page is displayed in a detail mode; and display preset event(s) to be processed in the preset events on the expedited processing page when the expedited processing page is displayed in an abbreviated mode.

In implementations, the display unit 1804 may include a detection unit 1806 to detect any preset event that occurs in real time when the communication page is in the open state; and a display control unit 1808 to display description information of the any preset event on the expedited processing page when the expedited processing page is in a detail mode, and display the expedited processing page in an abbreviated mode when the expedited processing page is in a hidden state, and display the description information of the any preset event on the expedited processing page.

In implementations, the apparatus 1800 may further include an execution unit 1810 to perform a preset operation for any preset event in response to detecting a triggering operation of the local communication party for the any preset event in the expedited processing page.

In implementations, the execution unit 1810 may be configured to:

call a detail page of the any preset event; and display detailed content the any preset event in the detail page.

In implementations, the execution unit 1810 may be configured to:

send a reminder message to the peer communication party for the any preset event when the any preset event is a preset event to be processed, the local communication party is an initiating party of the any preset event, and the peer communication party is a processing party; and perform preset processing on the any preset event when the any preset event is the preset event to be processed, the local communication party is the processing party of the any preset event, and the peer communication party is the initiating party.

In implementations, the apparatus 1800 may further include a labeling unit 1812 to display a description label for the peer communication party to mark the peer communication party in the expedited processing page, wherein content of the description label is related to at least one of the following factors:

user information of the peer communication party;

the preset events related to the peer communication party;

a label configuration command of the local communication party for the peer communication party.

Figure 19:
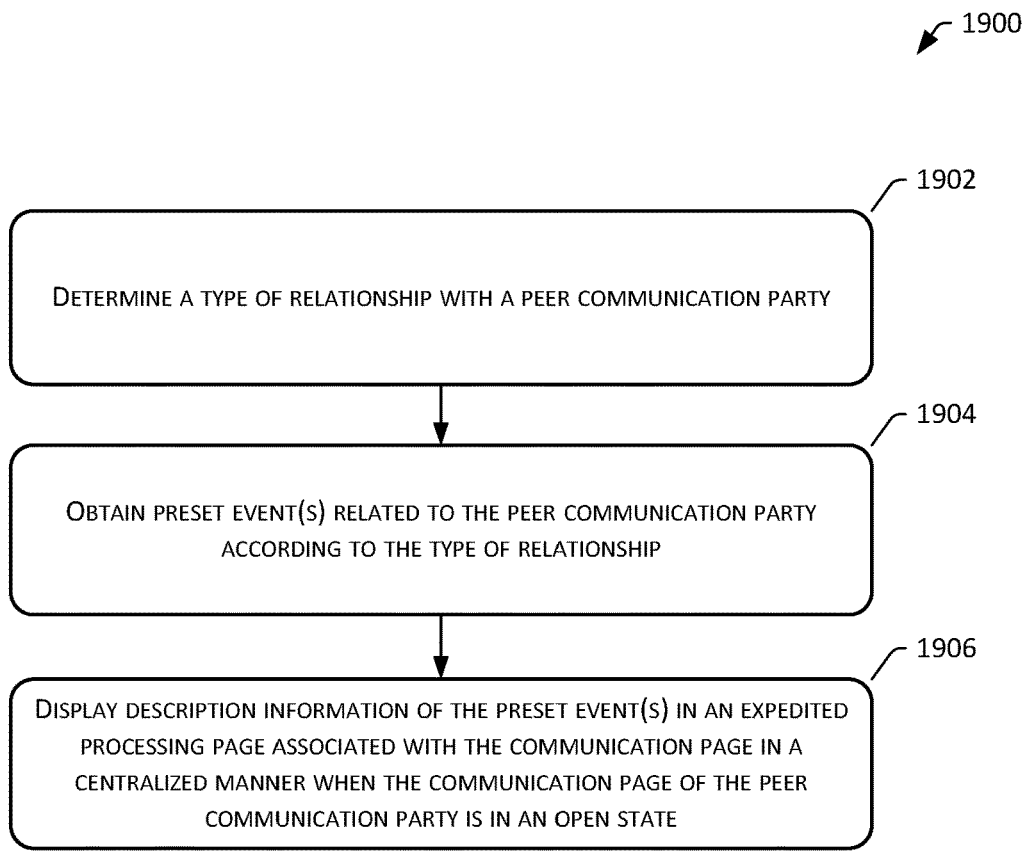
FIG. 19 is a flowchart of still another event display method according to an exemplary embodiment of the present application.

In the technical solutions of the present application, as shown in FIG. 8A, DING Talk can support multiple types of contact information in an address book, such as a group-independent "DING friends", and the like, and internal contact information related to a group. (corresponding to an "organizational structure"), external contact information (corresponding to an "external address book"), etc. For peer communication parties corresponding to different types of contact information, the local communication party actually has different situations of concern in practice. Therefore, according to a relationship type between a local communication party and a peer communication party, preset event(s) corresponding to the peer communication party can be selected differently to be displayed on an expedited processing page. Correspondingly, FIG. 19 shows a flowchart of still another event display method 1900 according to an exemplary embodiment of the present application. As shown in FIG. 19, the method 1900 may include the following operations.

Operation 1902: Determine a type of relationship with a peer communication party.

Operation 1904: Obtain preset event(s) related to the peer communication party according to the type of relationship.

For example, when the peer communication party is an external contact related to a group, as shown in FIG. 4, a communication event between the local communication party and the peer communication party, a responsible person replacement event, etc., may be displayed. When the peer communication party is an internal contact related to a group, as shown in FIG. 8B, a task event between the local communication party and the peer communication party, etc., may be displayed. When the peer communication party is a contact such as a friend who is unrelated to any group, as shown in FIG. 9, a communication event between the local communication party and the peer communication party may be displayed.

Therefore, a differentiated display of preset events according to relationship types can meet requirements of a user in different scenarios, thereby helping to improve the efficiency of viewing and processing related events by the user.

Operation 1906: Display description information of the preset event(s) in an expedited processing page associated with the communication page in a centralized manner when the communication page of the peer communication party is in an open state.

Figure 20:
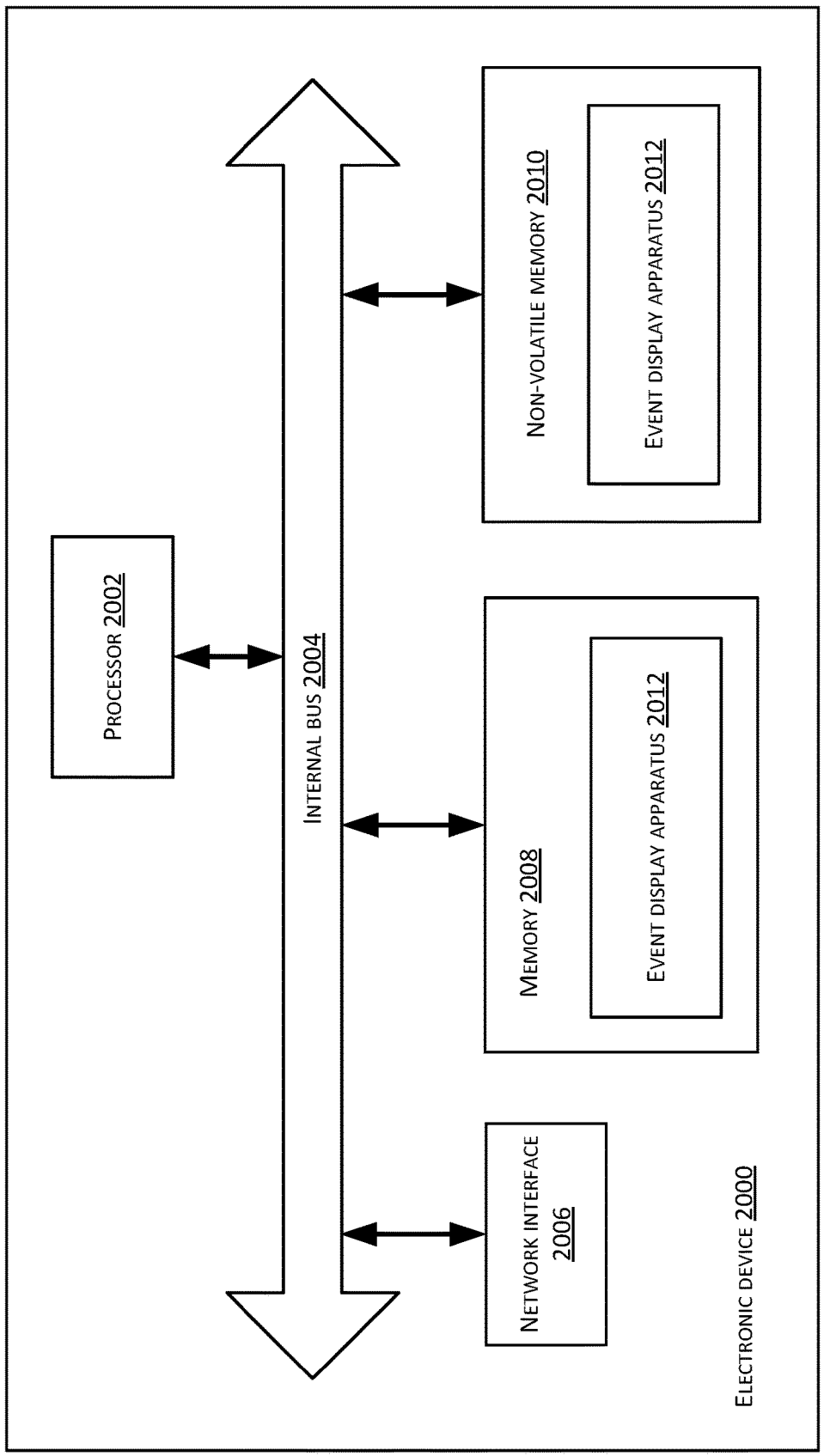
FIG. 20 is a schematic structural diagram of another electronic device according to an exemplary embodiment of the present application.

FIG. 20 shows a schematic structural diagram of an electronic device 2000 according to an exemplary embodiment of the present application. Referring to FIG. 20, at the hardware level, the electronic device 2000 includes a processor 2002, an internal bus 2004, a network interface 2006, memory 2008, and non-volatile memory 2010, and apparently may also include hardware needed by other services. The processor 2002 reads a corresponding computer program from the non-volatile memory 2010 into the memory 2002 and then runs to form an event display apparatus 2012 at a logical level. Apparently, in addition to software implementations, the present application does not exclude other manners of implementation, such as a logic device or a combination of software and hardware, etc. In other words, an execution entity of the following flow of processing is not limited to each logical unit, and may be a hardware or logic device.

Figure 21:
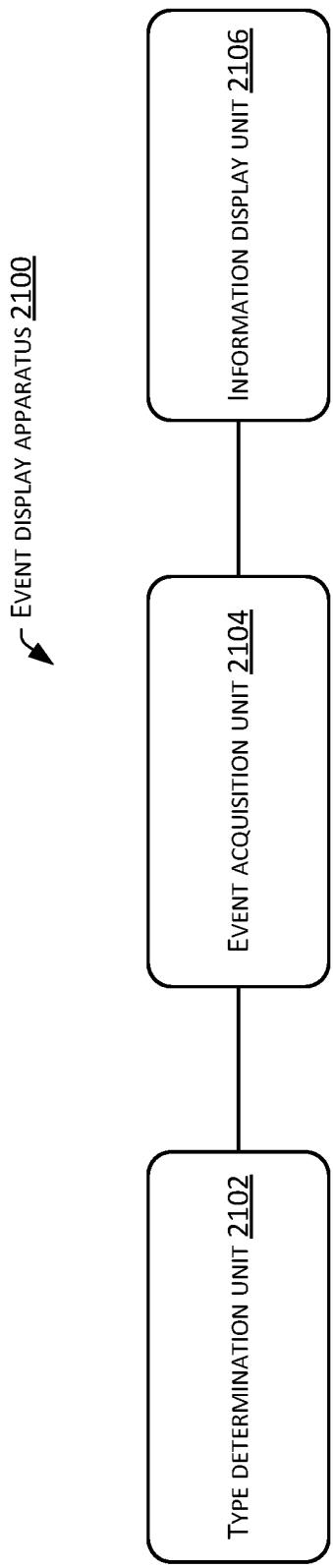
FIG. 21 is a block diagram of another event display apparatus according to an exemplary embodiment of the present application.

Referring to FIG. 21, in implementations, an event display apparatus 2100 may include a type determination unit 2102, an event acquisition unit 2104, and an information display unit 2106.

The type determination unit 2102 determines a type of relationship with a peer communication party.

The event acquisition unit 2104 obtains preset event(s) related to the peer communication party according to the type of relationship.

The information display unit 2106 displays description information of the preset event(s) in an expedited processing page associated with the communication page when the communication page of the peer communication party is in an open state.

Figure 22:
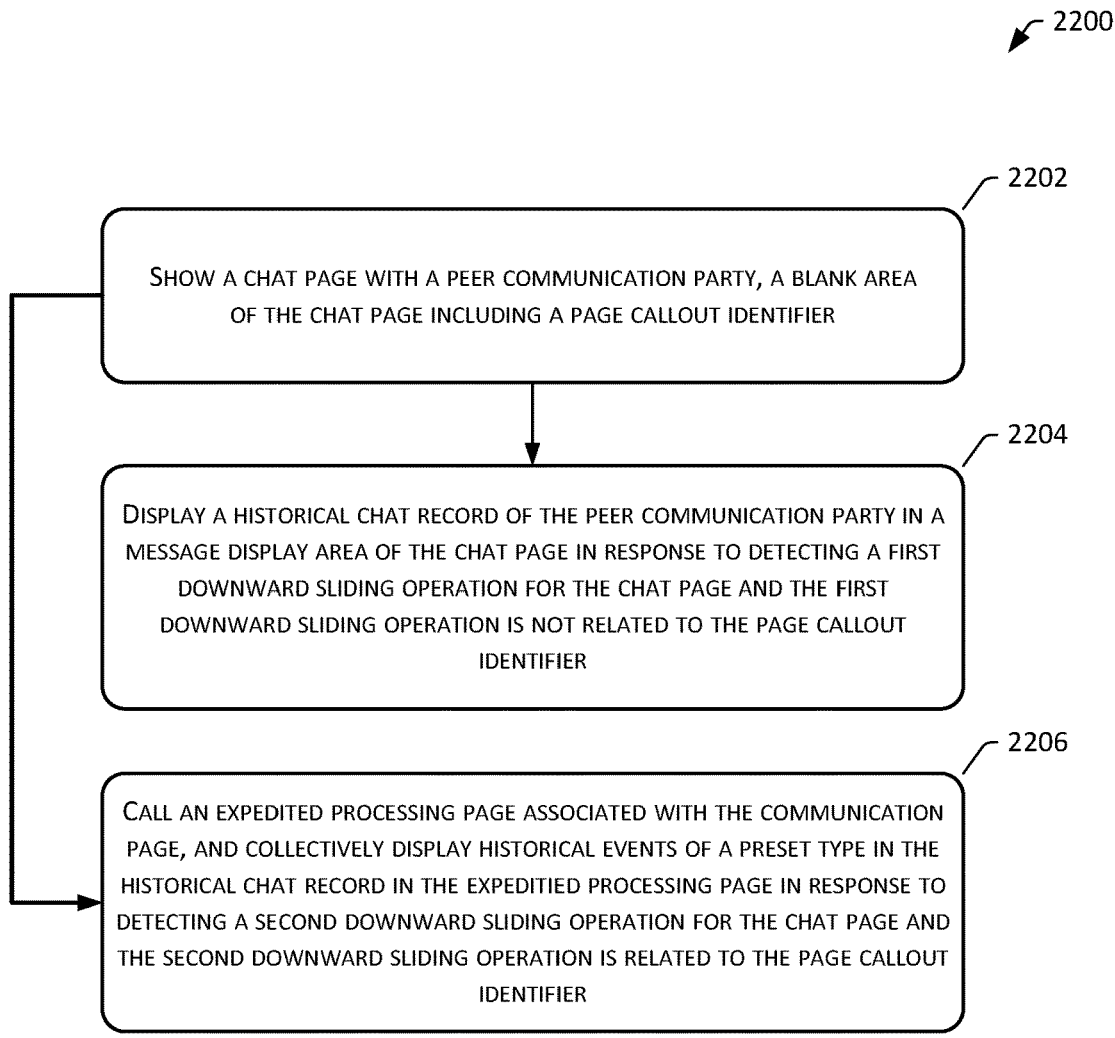
FIG. 22 is a flowchart of still another event display method according to an exemplary embodiment of the present application.

FIG. 22 shows a flowchart of still another event display method 2200 according to an exemplary embodiment of the present application. As shown in FIG. 22, the method 2200 may include the following operations.

Operation 2202: Show a chat page with a peer communication party, a blank area of the chat page including a page callout identifier.

Operation 2204: Display a historical chat record of the peer communication party in a message display area of the chat page in response to detecting a first downward sliding operation for the chat page and the first downward sliding operation is not related to the page callout identifier.

Operation 2206: Call an expedited processing page associated with the communication page, and collectively display historical events of a preset type in the historical chat record in the expedited processing page in response to detecting a second downward sliding operation for the chat page and the second downward sliding operation is related to the page callout identifier.

In implementations, according to correlations between downward sliding operations and a page callout identifier, the downward sliding operations can be divided into a first downward sliding operation and a second downward sliding operation, thereby applying the downward sliding operations to respectively implement displaying a historical chat record and calling an expedited processing page. This can realize repeated uses of such downward sliding operations, thereby simplifying user operations and reducing the learning cost of a user.

Figure 23:
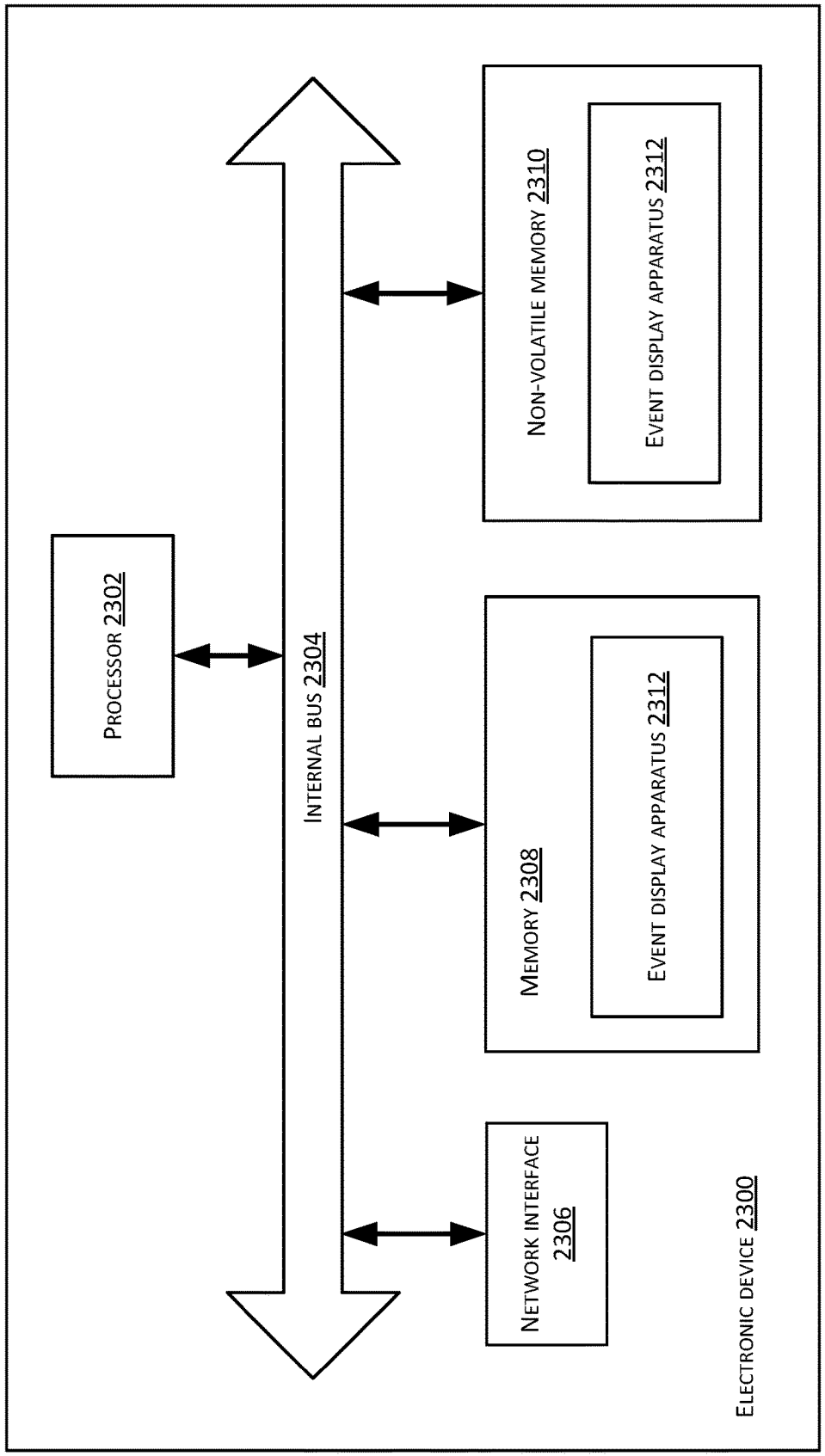
FIG. 23 is a schematic structural diagram of still another electronic device according to an exemplary embodiment of the present application.

FIG. 23 shows a schematic structural diagram of an electronic device 2300 according to an exemplary embodiment of the present application. Referring to FIG. 23, at the hardware level, the electronic device 2300 includes a processor 2302, an internal bus 2304, a network interface 2306, memory 2308, and non-volatile memory 2310, and apparently may also include hardware needed by other services. The processor 2302 reads a corresponding computer program from the non-volatile memory 2310 into the memory 2302 and then runs to form an event display apparatus 2312 on a logical level. Apparently, in addition to software implementations, the present application does not exclude other manners of implementation, such as a logic device or a combination of software and hardware, etc. In other words, an execution entity of the following flow of processing is not limited to each logical unit, and may be a hardware or logic device.

Figure 24:
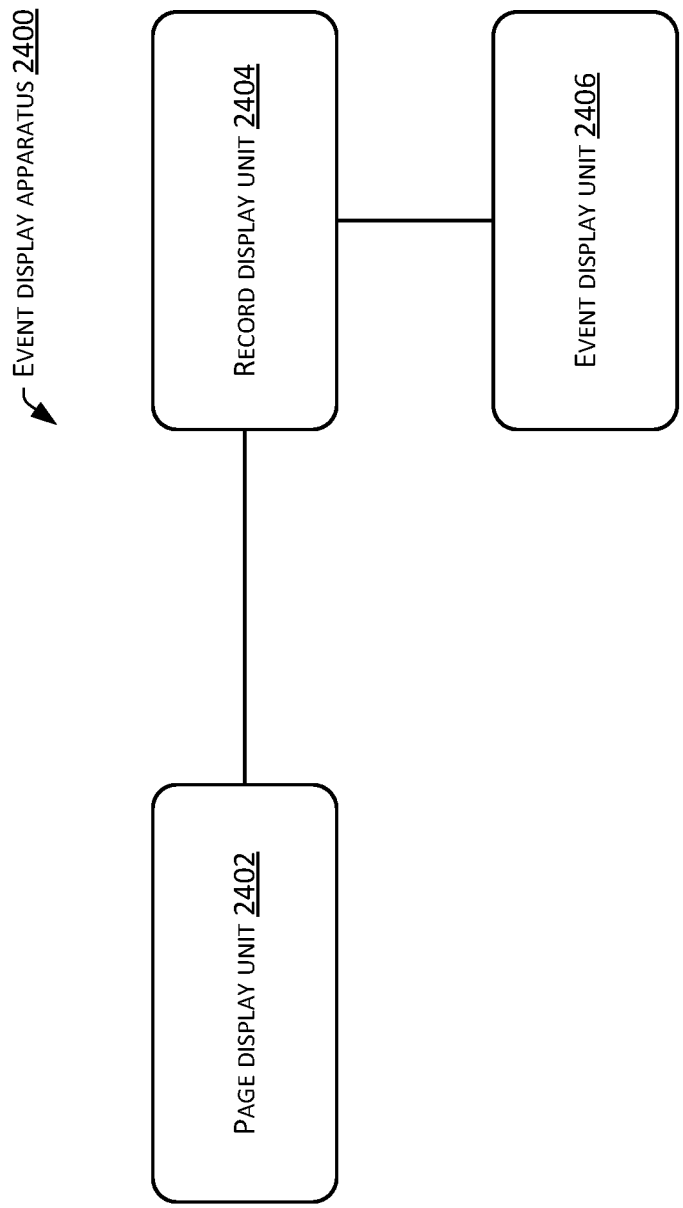
FIG. 24 is a block diagram of still another event display apparatus according to an exemplary embodiment of the present application.

Referring to FIG. 24, in implementations, an event display apparatus 2400 may include a page display unit 2402, a record display unit 2404, and an event display unit 2406.

The page display unit 2402 shows a chat page with a peer communication party, a blank area of the chat page including a page callout identifier The record display unit 2404 displays a historical chat record of the peer communication party in a message display area of the chat page in response to detecting a first downward sliding operation for the chat page and the first downward sliding operation is not related to the page callout identifier.

The event display unit 2406 calls an expedited processing page associated with the communication page, and collectively displays historical events of a preset type in the historical chat record in the expedited processing page in response to detecting a second downward sliding operation for the chat page and the second downward sliding operation is related to the page callout identifier.

Figure 25:
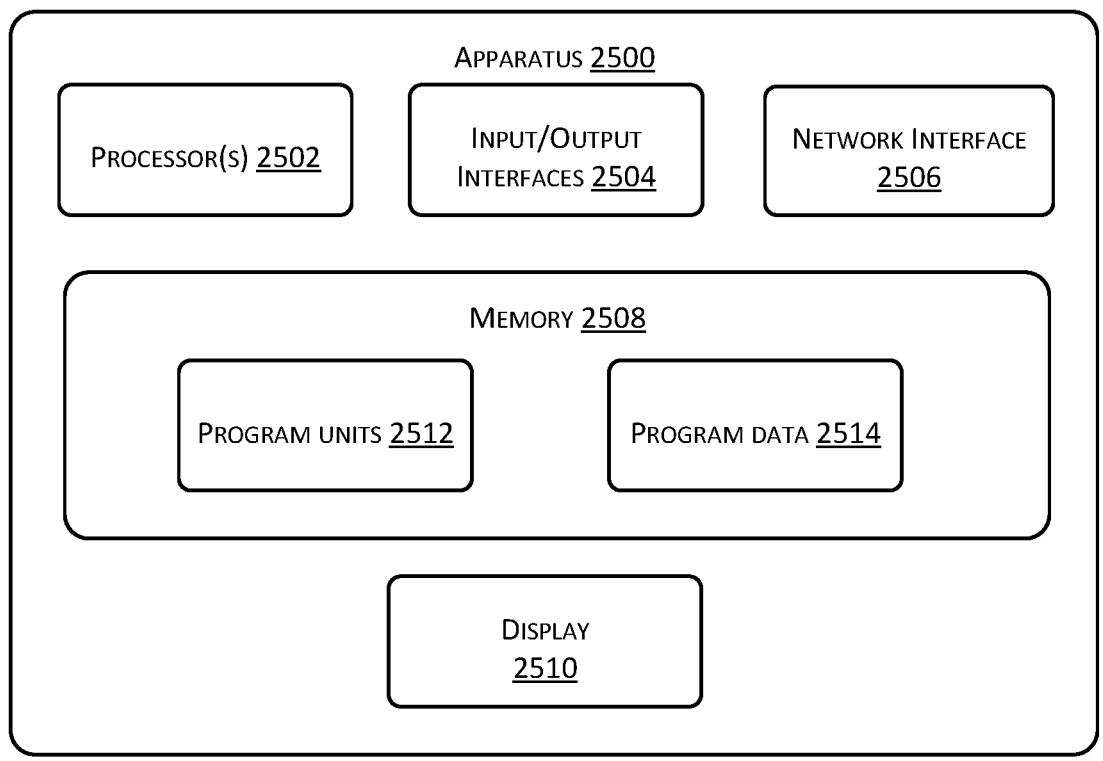
FIG. 25 is a schematic structural diagram of the event display apparatus as described in FIGS. 18, 21, and 24 in more detail.

FIG. 25 shows a schematic structural diagram of an example apparatus 2500 as described in FIGS. 18, 21, and 24 in further detail. In implementations, the apparatus 2500 may include one or more computing devices. In a typical configuration, a computing device includes one or more processors (CPUs), input/output interfaces, network interfaces, and memory. In implementations, the apparatus 2500 may be a part of one or more computing devices, e.g., implemented or run by the one or more computing devices. In implementations, the one or more computing devices may be located in a single place or distributed among a plurality of network devices over a network. By way of example and not limitation, the apparatus 2500 may include one or more processors 2502, an input/output (I/O) interface 2504, a network interface 2506, and memory 2508. Depending on which apparatus (e.g., the apparatus 1700, the apparatus 2100, and the apparatus 2400) that the apparatus 2500 represents, in implementations, the apparatus 2500 may further include a display 2510.

The memory 2508 may include a form of computer readable media such as a volatile memory, a random access memory (RAM) and/or a non-volatile memory, for example, a read-only memory (ROM) or a flash RAM. The memory 2508 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 2508 may include program modules 2512 and program data 2514. Depending on which apparatus (e.g., the apparatus 1700, the apparatus 2100, and the apparatus 2400) that the apparatus 2500 represents, the program modules 2512 may include one or more of the units as described in the foregoing description and shown in FIGS. 17, 21, and 24.

It is also noted that terms "include", "contain" or any other variations are intended to encompass a non-exclusive inclusion, such that a process, method, product, or device that includes a series of elements not only includes these elements, but also includes other elements that are not explicitly listed, or also includes elements that are inherent to such process, method, product, or device. Without further limitation, an element that is defined by a phrase "comprising a . . . " does not exclude the presence of other identical elements in a process, method, product, or device that includes the element.

Exemplary embodiments are described in detail herein, and examples thereof are illustrated in the accompanying drawings. When the accompanying drawings are involved in the following description, same or similar numbers in different figures represent same or similar elements, unless indicated otherwise. Implementations described in the following exemplary embodiments do not represent all the embodiments that are consistent with the present application. Instead, they are merely examples of apparatuses and methods that are consistent with some aspects of the present application as detailed in the appended claims.

Terminologies used in the present application are merely for the purpose of describing particular embodiments, and are not intended to limit the present application. Singular forms "a", "said" and "the" are intended to include plural forms, unless stated clearly in the context otherwise. It should also be understood that a term "and/or" used herein refers to and includes any or all possible combinations of one or more of associated items that are listed.

It should be understood that, although terms such as first, second, third, etc. may be used in the present application to describe various types of information, these pieces of information should not be limited to these terms. These terms are merely used for distinguishing information of the same type. For example, without departing from the scope of the present application, first information may also be referred to as second information, and similarly, the second information may also be referred to as the first information. Depending on the context, a term "if" used herein may be interpreted as "when" or "in an event of" or "in response to determining".

The above description merely corresponds to preferred embodiments of the present application, and is not intended to limit the present application. Any modifications, equivalent replacements, improvements, etc. that are made within the spirit and principles of the present application are included in the scope of protection of the present application.

The present disclosure can be further understood using the following clauses.

Clause 1: An event display method comprising: determining preset events related to a peer communication party; and displaying description information of the preset events in an expedited processing page associated with a communication page of the peer communication party in a centralized manner when the communication page is in an open state.

Clause 2: The method of Clause 1, wherein the preset events related to the peer communication party are determined using at least one of the following manners: selecting a preset event that is of a preset type and is related to the peer communication party from recorded historical events; determining a preset event that is of a preset type and is related to the peer communication party from among real-time events that are detected; and creating a preset event related to the peer communication party according to a customizing operation of the local communication party in the expedited processing page.

Clause 3: The method of Clause 1, wherein the preset events related to the peer communication party comprise a first type of event between the local communication party and the peer communication party.

Clause 4: The method of Clause 1, wherein the preset events related to the peer communication party comprise a second type of event between another communication party and the peer communication party, the local communication party having a browsing permission for the second type of event.

Clause 5: The method of Clause 4, wherein the browsing permission is obtained by the local communication party using at least one of the following manners when the local communication party and the other communication party belong to a same group: the local communication party obtaining the browsing permission for the second type of event when assigned to communicate with the peer communication party in place of the other communication party; a group management level of the local communication party being higher than that of the other communication party; and the local communication party being given the browsing permission of the second type of event by the other communication party.

Clause 6: The method of Clause 1, wherein the preset events comprise at least one of the following: a communication event related to communication behavior; and a group processing event related to a group processing function when the group processing function is included in a communication application corresponding to the communication page.

Clause 7: The method of Clause 1, wherein: when group ownership information of the local communication party and the peer communication party is inconsistent, the preset events comprise all preset events related to the peer communication party; and when the group ownership information of the local communication party and the peer communication party is consistent, the preset events include a preset event that is to be processed and related to the peer communication party.

Clause 8: The method of Clause 1, wherein displaying the description information of the preset events in the expedited processing page associated with the communication page of the peer communication party in the centralized manner comprises: synchronously display the expedited processing page to display the description information of the preset events in the concentrated manner when the communication page is detected to be in the open state; or switching the expedited processing page from a hidden state to a displayed state to display the description information of the preset events in the concentrated manner when the communication page is detected to be in the open state and a preset triggering operation for the communication page is detected.

Clause 9: The method of Clause 1, wherein displaying the description information of the preset events in the expedited processing page associated with the communication page of the peer communication party in the centralized manner comprises: displaying all the preset events on the expedited processing page in the concentrated manner when the expedited processing page is displayed in a detail mode; and displaying a preset event to be processed in the preset events on the expedited processing page when the expedited processing page is displayed in an abbreviated mode.

Clause 10: The method of Clause 1, wherein displaying the description information of the preset events in the expedited processing page associated with the communication page of the peer communication party in the centralized manner comprises: detecting any preset event that occurs in real time when the communication page is in the open state; displaying description information of the any preset event on the expedited processing page when the expedited processing page is in a detail mode; and displaying the expedited processing page in an abbreviated mode when the expedited processing page is in a hidden state, and displaying the description information of the any preset event on the expedited processing page.

Clause 11: The method of Clause 1, further comprising performing a preset operation for any preset event in response to detecting a triggering operation of the local communication party for the any preset event in the expedited processing page.

Clause 12: The method of Clause 11, wherein performing the preset operation for the any preset event comprises: calling a detail page of the any preset event; and displaying detailed content the any preset event in the detail page.

Clause 13: The method of Clause 11, wherein performing the preset operation for the any preset event comprises: sending a reminder message to the peer communication party for the any preset event when the any preset event is a preset event to be processed, the local communication party is an initiating party of the any preset event, and the peer communication party is a processing party; and performing preset processing on the any preset event when the any preset event is the preset event to be processed, the local communication party is the processing party of the any preset event, and the peer communication party is the initiating party.

Clause 14: The method of Clause 1, further comprising: displaying a description label for the peer communication party to mark the peer communication party in the expedited processing page, wherein content of the description label is related to at least one of the following factors: user information of the peer communication party; the preset events related to the peer communication party; and a label configuration command of the local communication party for the peer communication party.

Clause 15: An event display method comprising: determining a type of relationship with a peer communication party; obtaining preset events related to the peer communication party according to the type of relationship; and displaying description information of the preset events in an expedited processing page associated with a communication page of the peer communication party in a centralized manner when the communication page is in an open state.

Clause 16: An event display method comprising: showing a chat page with a peer communication party, a blank area of the chat page including a page callout identifier; displaying a historical chat record with the peer communication party in a message display area of the chat page when a first downward sliding operation is detected on the chat page and the first downward sliding operation is not related to the page callout identifier; and calling an expedited processing page associated with the chat page when a second downward sliding operation is detected on the chat page and the second downward sliding operation is related to the page callout identifier, and displaying a historical event set of a preset type in the historical chat record in the expedited processing page.

Clause 17: A historical event display apparatus comprising: a determination unit to determine preset events related to a peer communication party; and a display unit to display description information of the preset events in an expedited processing page associated with a communication page of the peer communication party in a centralized manner when the communication page is in an open state.

Clause 18: An event display apparatus comprising: a type determination unit to determine a type of relationship with a peer communication party; an event acquisition unit to obtain preset events related to the peer communication party according to the type of relationship; and an information display unit to display description information of the preset events in an expedited processing page associated with a communication page of the peer communication party in a centralized manner when the communication page is in an open state.

Clause 19: An event display apparatus comprising: a page display unit to show a chat page with a peer communication party, a blank area of the chat page including a page callout identifier; a record display unit to display a historical chat record with the peer communication party in a message display area of the chat page when a first downward sliding operation is detected on the chat page and the first downward sliding operation is not related to the page callout identifier; and an event display unit to call an expedited processing page associated with the chat page when a second downward sliding operation is detected on the chat page and the second downward sliding operation is related to the page callout identifier, and to display a historical event set of a preset type in the historical chat record in the expedited processing page.

What is claimed is:

1. A method comprising:
   determining past preset events related to a peer communication party, the preset events including recorded description information describing historical operations performed by the peer communication party based on a communication application installed on a first electronic device;
   detecting, on a second electronic device, whether a communication page of a local communication party with the peer communication party is in an open state;
   synchronizing an expedited processing page at the second electronic device with the determined preset events; and
   displaying, on the second electronic device, description information of the preset events in an expedited processing page associated with the communication page in a centralized manner when the communication page is detected to be in an open state;
   wherein displaying the description information of the preset events in the expedited processing page associated with the communication page of the peer communication party in the centralized manner comprises switching the expedited processing page from a hidden state to a displayed state to display the description information of the preset events in the centralized manner when the communication page is detected to be in the open state and a preset triggering operation for the communication page is detected.

2. The method of claim 1, wherein the preset events related to the peer communication party are determined by at least one of:
   selecting a preset event that is of a preset type and is related to the peer communication party from recorded historical events;
   determining a preset event that is of a preset type and is related to the peer communication party from among real-time events that are detected; and
   creating a preset event related to the peer communication party according to a customizing operation of the local communication party in the expedited processing page.

3. The method of claim 1, wherein the preset events related to the peer communication party comprise a first type of event between the local communication party and the peer communication party.

4. The method of claim 1, wherein the preset events related to the peer communication party comprise a second type of event between another communication party and the peer communication party, the local communication party having a browsing permission for the second type of event.

5. The method of claim 4, wherein: when the local communication party and the other communication party belong to a same group, the browsing permission is obtained by the local communication party using at least one of:

the local communication party obtaining the browsing permission for the second type of event when assigned to communicate with the peer communication party in place of the other communication party;

a group management level of the local communication party being higher than that of the other communication party; and the local communication party being given the browsing permission of the second type of event by the other communication party.

6. The method of claim 1, wherein the preset events comprise at least one of:

a communication event related to communication behavior; and a group processing event related to a group processing function when the group processing function is included in a communication application corresponding to the communication page.

7. The method of claim 1, wherein:

when group ownership information of the local communication party and the peer communication party is inconsistent, the preset events comprise all preset events related to the peer communication party; and when the group ownership information of the local communication party and the peer communication party is consistent, the preset events include a preset event that is to be processed and related to the peer communication party.

8. The method of claim 1, wherein displaying the description information of the preset events in the expedited processing page associated with the communication page of the peer communication party in the centralized manner further comprises synchronously displaying the expedited processing page to collectively display the description information of the preset events when the communication page is detected to be in the open state.

9. The method of claim 1, wherein displaying the description information of the preset events in the expedited processing page associated with the communication page of the peer communication party in the centralized manner comprises:

collectively displaying all the preset events on the expedited processing page when the expedited processing page is displayed in a detail mode; and displaying a preset event to be processed in the preset events on the expedited processing page when the expedited processing page is displayed in an abbreviated mode.

10. The method of claim 1, wherein displaying the description information of the preset events in the expedited processing page associated with the communication page of the peer communication party in the centralized manner comprises:

detecting any preset event that occurs in real time when the communication page is in the open state;

displaying description information of the any preset event on the expedited processing page when the expedited processing page is in a detail mode; and displaying the expedited processing page in an abbreviated mode when the expedited processing page is in a hidden state, and displaying the description information of the any preset event on the expedited processing page.

11. The method of claim 1, further comprising performing a preset operation for any preset event in response to detecting a triggering operation of the local communication party for the any preset event in the expedited processing page.

12. The method of claim 11, wherein performing the preset operation for the any preset event comprises:

calling a detail page of the any preset event; and displaying detailed content of the any preset event in the detail page.

13. The method of claim 11, wherein performing the preset operation for the any preset event comprises:

sending a reminder message to the peer communication party for the any preset event when the any preset event is a preset event to be processed, the local communication party is an initiating party of the any preset event, and the peer communication party is a processing party; and performing preset processing on the any preset event when the any preset event is the preset event to be processed, the local communication party is the processing party of the any preset event, and the peer communication party is the initiating party.

14. The method of claim 1, further comprising:

displaying a description label for the peer communication party to mark the peer communication party in the expedited processing page, wherein content of the description label is related to at least one of the following factors:

user information of the peer communication party;

the preset events related to the peer communication party; and a label configuration command of the local communication party for the peer communication party.

15. One or more computer readable media storing executable instructions that, when executed by one or more processors, cause the one or more processors to perform acts comprising:

determining past preset events related to a peer communication party, the preset events including recorded description information describing historical operations performed by the peer communication party based on a communication application installed on a first electronic device;

detecting, on a second electronic device, whether a communication page of a local communication party with the peer communication party is in an open state;

synchronizing an expedited processing page at the second electronic device with the determined preset events; and displaying, on the second electronic device, description information of the preset events in an expedited processing page associated with the communication page in a centralized manner when the communication page is detected to be in an open state;

wherein displaying the description information of the preset events in the expedited processing page associated with the communication page of the peer communication party in the centralized manner comprises switching the expedited processing page from a hidden state to a displayed state to display the description information of the preset events in the centralized manner when the communication page is detected to be in the open state and a preset triggering operation for the communication page is detected.

16. The one or more computer readable media of claim 15, wherein the preset events related to the peer communication party are determined by at least one of:

selecting a preset event that is of a preset type and is related to the peer communication party from recorded historical events;

determining a preset event that is of a preset type and is related to the peer communication party from among real-time events that are detected; and creating a preset event related to the peer communication party according to a customizing operation of the local communication party in the expedited processing page.

17. The one or more computer readable media of claim 15, wherein the preset events related to the peer communication party comprise a second type of event between another communication party and the peer communication party, the local communication party having a browsing permission for the second type of event.

18. The one or more computer readable media of claim 17, wherein: when the local communication party and the other communication party belong to a same group, the browsing permission is obtained by the local communication party using at least one of:

the local communication party obtaining the browsing permission for the second type of event when assigned to communicate with the peer communication party in place of the other communication party;

a group management level of the local communication party being higher than that of the other communication party; and the local communication party being given the browsing permission of the second type of event by the other communication party.

19. The one or more computer readable media of claim 15, wherein displaying the description information of the preset events in the expedited processing page associated with the communication page of the peer communication party in the centralized manner comprises:

detecting any preset event that occurs in real time when the communication page is in the open state;

displaying description information of the any preset event on the expedited processing page when the expedited processing page is in a detail mode; and displaying the expedited processing page in an abbreviated mode when the expedited processing page is in a hidden state, and displaying the description information of the any preset event on the expedited processing page.

20. An apparatus comprising:

one or more processors;

memory storing thereon computer-readable instructions that, when executed by the one or more processors, cause the one or more processors to perform acts comprising:

determining a type of relationship with a peer communication party;

obtaining past preset events related to the peer communication party according to the type of relationship, the preset events including recorded description information describing historical operations performed by the peer communication party based on a communication application installed on a first electronic device;

detecting, on a second electronic device, whether a communication page of a local communication party with the peer communication party is in an open state;

synchronizing an expedited processing page at the second electronic device with the determined preset events; and displaying, on the second electronic device, description information of the preset events in an expedited processing page associated with the communication page in a centralized manner when the communication page is detected to be in an open state;

wherein displaying the description information of the preset events in the expedited processing page associated with the communication page of the peer communication party in the centralized manner comprises switching the expedited processing page from a hidden state to a displayed state to display the description information of the preset events in the centralized manner when the communication page is detected to be in the open state and a preset triggering operation for the communication page is detected.

* * * * *